(12) United States Patent
Drake et al.

(10) Patent No.: US 8,783,706 B2
(45) Date of Patent: *Jul. 22, 2014

(54) GOOSENECK COUPLER WITH SLIDEABLE LOCKING MEMBERS AND CLINCH

(75) Inventors: Frank Drake, Wausau, WI (US); Kevin Rabska, Junction City, WI (US)

(73) Assignee: Cequent Performance Products, Inc., Plymouth, MI (US)

( * ) Notice: Subject to any disclaimer, the term of this patent is extended or adjusted under 35 U.S.C. 154(b) by 253 days.

This patent is subject to a terminal disclaimer.

(21) Appl. No.: 13/299,453

(22) Filed: Nov. 18, 2011

(65) Prior Publication Data

US 2012/0211966 A1 Aug. 23, 2012

Related U.S. Application Data

(60) Provisional application No. 61/444,878, filed on Feb. 21, 2011.

(51) Int. Cl.
*B62D 53/04* (2006.01)
*B62D 53/06* (2006.01)

(52) U.S. Cl.
CPC .............. *B62D 53/04* (2013.01); *B62D 53/065* (2013.01)
USPC ...................................... 280/441.2

(58) Field of Classification Search
USPC ................ 280/509, 510, 507, 441.2, 511
See application file for complete search history.

(56) References Cited

U.S. PATENT DOCUMENTS

| | | | |
|---|---|---|---|
| 1,359,213 A | 11/1920 | Welch | |
| 1,380,490 A | 6/1921 | Masury | |
| 1,780,531 A | 11/1930 | Messier | |
| 1,867,670 A | 7/1932 | Lubbers | |
| 1,880,894 A | 10/1932 | Dorman | |
| 1,953,365 A | 4/1934 | Reetz | |
| 2,118,544 A | 5/1938 | Asbury | |
| 2,150,269 A | 3/1939 | Dreisbach | |
| 2,204,882 A | 6/1940 | Berluti | |
| 2,474,296 A | 6/1949 | Wiltsee | |
| 2,558,906 A * | 7/1951 | Leon | 280/511 |
| 2,563,372 A | 8/1951 | Risse | |
| 2,641,124 A | 6/1953 | Gallagher et al. | |
| 2,656,706 A | 10/1953 | Lucas et al. | |
| 2,706,644 A | 4/1955 | Black | |
| 2,733,931 A | 2/1956 | Reid et al. | |
| 2,848,253 A | 8/1958 | Walker | |
| 2,885,015 A | 5/1959 | Koch et al. | |
| 2,891,806 A | 6/1959 | Haverly et al. | |
| 2,968,496 A | 1/1961 | Gouirand | |
| 3,014,545 A | 12/1961 | Shepley | |
| 3,092,399 A | 6/1963 | Hair | |
| 3,123,382 A | 3/1964 | Toland | |
| 3,137,515 A | 6/1964 | Masser | |

(Continued)

*Primary Examiner* — Tony Winner

(74) *Attorney, Agent, or Firm* — McDonald Hopkins LLC

(57) ABSTRACT

A gooseneck coupler may be used on a towing vehicle to help tow certain types of towed vehicles, such as trailers. The gooseneck coupler may include a first member, a second member pivotally attached to the first member, where the second member is capable of pivoting relative to the first member from a first position to a second position. The gooseneck coupler may also include an opening in the first member, the opening sized to receive a hitch ball, and a clinch mechanism located within the opening where the hitch ball is wedged between the clinch mechanism and the second member when the second member is in the second position relative to the first member.

31 Claims, 28 Drawing Sheets

(56) References Cited

U.S. PATENT DOCUMENTS

| | | |
|---|---|---|
| 3,203,723 A | 8/1965 | Montenare |
| 3,208,770 A | 9/1965 | Frietas et al. |
| 3,227,470 A | 1/1966 | Funk |
| 3,236,541 A | 2/1966 | Poteet |
| 3,269,159 A | 8/1966 | Young |
| 3,269,751 A | 8/1966 | Whattoff |
| 3,326,573 A | 6/1967 | Neitzey, Jr. |
| 3,374,268 A | 3/1968 | Groves |
| 3,380,758 A | 4/1968 | Granning |
| 3,391,555 A | 7/1968 | Mamo |
| 3,396,926 A | 8/1968 | Shelton et al. |
| 3,400,949 A | 9/1968 | Kendall |
| 3,426,377 A | 2/1969 | Beckwith et al. |
| 3,527,476 A | 9/1970 | Winckler |
| 3,591,200 A | 7/1971 | Van Raden |
| 3,605,457 A | 9/1971 | Foster |
| 3,708,183 A | 1/1973 | Jones |
| 3,717,273 A | 2/1973 | Berends |
| 3,759,549 A | 9/1973 | Morris |
| 3,773,357 A | 11/1973 | Austin |
| 3,796,443 A | 3/1974 | Crutchfield |
| 3,796,444 A | 3/1974 | Hixon |
| 3,810,661 A | 5/1974 | Lowrance |
| 3,820,823 A | 6/1974 | Beaston |
| 3,831,982 A | 8/1974 | Bernhardt et al. |
| 3,865,406 A | 2/1975 | Dutton |
| 3,889,978 A | 6/1975 | Kann |
| 3,891,239 A | 6/1975 | Leo et al. |
| 3,893,713 A | 7/1975 | Ivy |
| 3,895,767 A | 7/1975 | Maughlin et al. |
| 3,945,668 A | 3/1976 | Holland |
| 3,955,831 A | 5/1976 | Whitchurch |
| 4,000,911 A | 1/1977 | Weber |
| 4,057,265 A | 11/1977 | Grace |
| 4,077,650 A | 3/1978 | Leach, Jr. |
| 4,088,339 A | 5/1978 | Sagebiel |
| 4,103,927 A | 8/1978 | Schmidt |
| 4,119,328 A | 10/1978 | Rhodes |
| 4,133,553 A | 1/1979 | Pierce |
| 4,137,587 A | 2/1979 | Rosengren |
| 4,141,569 A | 2/1979 | Dilk |
| 4,148,498 A | 4/1979 | Taylor, Jr. |
| 4,153,270 A | 5/1979 | Brockmiller |
| 4,157,190 A | 6/1979 | Nyman |
| D252,377 S | 7/1979 | Mallory et al. |
| 4,168,847 A | 9/1979 | Westphal |
| 4,184,558 A | 1/1980 | deBuhr et al. |
| 4,186,940 A | 2/1980 | Pillars |
| 4,215,876 A | 8/1980 | Jacks |
| 4,248,451 A | 2/1981 | Usinger |
| 4,256,324 A | 3/1981 | Hamilton |
| 4,348,035 A | 9/1982 | Wasservogel |
| 4,373,847 A | 2/1983 | Hipp et al. |
| 4,523,338 A | 6/1985 | May |
| 4,540,194 A | 9/1985 | Dane |
| 4,564,209 A | 1/1986 | Kingsley et al. |
| 4,570,966 A | 2/1986 | Giboney et al. |
| 4,580,806 A | 4/1986 | Kolstad et al. |
| 4,632,371 A | 12/1986 | Wirges et al. |
| 4,657,274 A | 4/1987 | Mann et al. |
| 4,662,647 A | 5/1987 | Calvert |
| 4,711,106 A | 12/1987 | Johnson |
| 4,730,841 A | 3/1988 | Ponder |
| 4,778,196 A | 10/1988 | Spoliansky |
| 4,832,358 A | 5/1989 | Bull |
| 4,832,360 A * | 5/1989 | Christian .................. 280/511 |
| 4,887,831 A | 12/1989 | Edwards |
| 4,906,015 A | 3/1990 | LaCroix et al. |
| 4,921,266 A | 5/1990 | Beals |
| 4,925,205 A | 5/1990 | Villalon et al. |
| 4,929,028 A | 5/1990 | Underwood |
| 5,013,060 A | 5/1991 | Van Andel et al. |
| 5,016,898 A | 5/1991 | Works et al. |
| 5,018,759 A | 5/1991 | Villalon et al. |
| D317,426 S | 6/1991 | Lytle |
| 5,028,067 A | 7/1991 | Madura |
| 5,080,519 A | 1/1992 | Chi |
| 5,104,138 A | 4/1992 | Allen |
| 5,125,679 A | 6/1992 | Delano |
| 5,133,572 A | 7/1992 | Polito |
| 5,143,393 A | 9/1992 | Meyer |
| 5,209,316 A | 5/1993 | Bauer |
| 5,226,675 A | 7/1993 | Noah et al. |
| 5,246,244 A | 9/1993 | Colibert |
| 5,263,735 A | 11/1993 | Mann |
| 5,284,038 A | 2/1994 | Johnson |
| D346,782 S | 5/1994 | Schmidt |
| 5,322,313 A | 6/1994 | Schroeder |
| 5,332,248 A | 7/1994 | Higginbotham |
| 5,342,076 A | 8/1994 | Swindall |
| 5,382,109 A | 1/1995 | Nyman |
| 5,388,849 A | 2/1995 | Arsenault et al. |
| 5,410,893 A | 5/1995 | Easterwood |
| 5,413,366 A | 5/1995 | Gibbons |
| 5,427,471 A | 6/1995 | Godbersen |
| 5,433,468 A | 7/1995 | Dixon |
| 5,435,585 A | 7/1995 | Chambers |
| 5,441,295 A | 8/1995 | Smith |
| 5,472,222 A | 12/1995 | Marcy |
| 5,503,423 A | 4/1996 | Roberts et al. |
| 5,540,065 A | 7/1996 | Wyers |
| 5,544,505 A | 8/1996 | McIntosh et al. |
| 5,547,210 A | 8/1996 | Dugger |
| 5,549,322 A | 8/1996 | Hauri |
| 5,571,270 A | 11/1996 | Larkin |
| 5,577,751 A | 11/1996 | Matthews |
| 5,582,420 A | 12/1996 | Ulbrich |
| 5,584,495 A | 12/1996 | Mason |
| 5,593,139 A | 1/1997 | Julian |
| 5,603,597 A | 2/1997 | Clay, Sr. |
| 5,605,264 A | 2/1997 | Neal |
| 5,639,106 A | 6/1997 | Vitale et al. |
| 5,653,366 A | 8/1997 | Liserre |
| 5,681,053 A | 10/1997 | Misukanis et al. |
| 5,695,204 A | 12/1997 | Ford |
| 5,700,024 A | 12/1997 | Upchurch |
| 5,704,086 A | 1/1998 | Hansen et al. |
| 5,741,022 A | 4/1998 | Wass et al. |
| 5,755,452 A | 5/1998 | Tambornino |
| 5,775,139 A | 7/1998 | Sellers |
| 5,785,341 A | 7/1998 | Fenton |
| 5,788,258 A | 8/1998 | Gill et al. |
| D397,657 S | 9/1998 | Lindenman et al. |
| D399,804 S | 10/1998 | Lindenman et al. |
| 5,823,560 A | 10/1998 | Van Vleet |
| D401,542 S | 11/1998 | Lindenman et al. |
| 5,836,603 A | 11/1998 | Logan et al. |
| 5,853,186 A | 12/1998 | Gentner et al. |
| 5,860,671 A | 1/1999 | Mackeown |
| D406,086 S | 2/1999 | Lindenman et al. |
| 5,873,271 A | 2/1999 | Smith |
| 5,888,015 A | 3/1999 | Brown et al. |
| 5,906,387 A | 5/1999 | Wallace |
| 5,937,679 A | 8/1999 | Villalon, Jr. |
| 5,947,506 A | 9/1999 | Bauer |
| 5,956,980 A | 9/1999 | Jenkins, Jr. |
| 5,971,418 A | 10/1999 | Lindenman et al. |
| 5,975,553 A | 11/1999 | Van Vleet |
| 5,987,938 A | 11/1999 | Frei |
| 6,062,583 A | 5/2000 | Lauricella, Jr. |
| 6,070,441 A | 6/2000 | Bernstrom |
| 6,095,545 A | 8/2000 | Bol, III et al. |
| 6,116,631 A | 9/2000 | Logan et al. |
| 6,155,589 A | 12/2000 | Simpson |
| 6,170,849 B1 | 1/2001 | McCall |
| 6,170,852 B1 | 1/2001 | Kimbrough |
| 6,199,890 B1 | 3/2001 | Lindenman et al. |
| 6,202,453 B1 | 3/2001 | Disher et al. |
| 6,234,509 B1 | 5/2001 | Lara |
| 6,244,080 B1 | 6/2001 | Sakurai |
| 6,264,229 B1 | 7/2001 | Gill |
| 6,382,336 B1 | 5/2002 | Smith |
| 6,409,202 B1 | 6/2002 | Putnam |
| 6,447,000 B1 | 9/2002 | Dick et al. |

(56) References Cited

U.S. PATENT DOCUMENTS

| | | |
|---|---|---|
| 6,533,308 B1 | 3/2003 | Tambornino |
| 6,572,124 B2 | 6/2003 | Misna et al. |
| 6,581,951 B2 | 6/2003 | Lange |
| 6,746,037 B1 | 6/2004 | Kaplenski et al. |
| 6,976,695 B1 | 12/2005 | Smith, III |
| 7,378,013 B2 * | 5/2008 | Sandler ............... 280/507 |
| 7,552,937 B1 | 6/2009 | Taylor |
| 8,235,411 B2 * | 8/2012 | Works et al. ............ 280/508 |
| 8,286,983 B2 * | 10/2012 | Hellbusch ............ 280/417.1 |
| 2003/0047908 A1 | 3/2003 | Lara |
| 2004/0195801 A1 | 10/2004 | Lara |
| 2004/0239074 A1 | 12/2004 | Lindenman et al. |
| 2008/0292390 A1 | 11/2008 | Walstrom et al. |
| 2012/0211965 A1 | 8/2012 | Drake et al. |
| 2012/0211966 A1 | 8/2012 | Drake et al. |

* cited by examiner

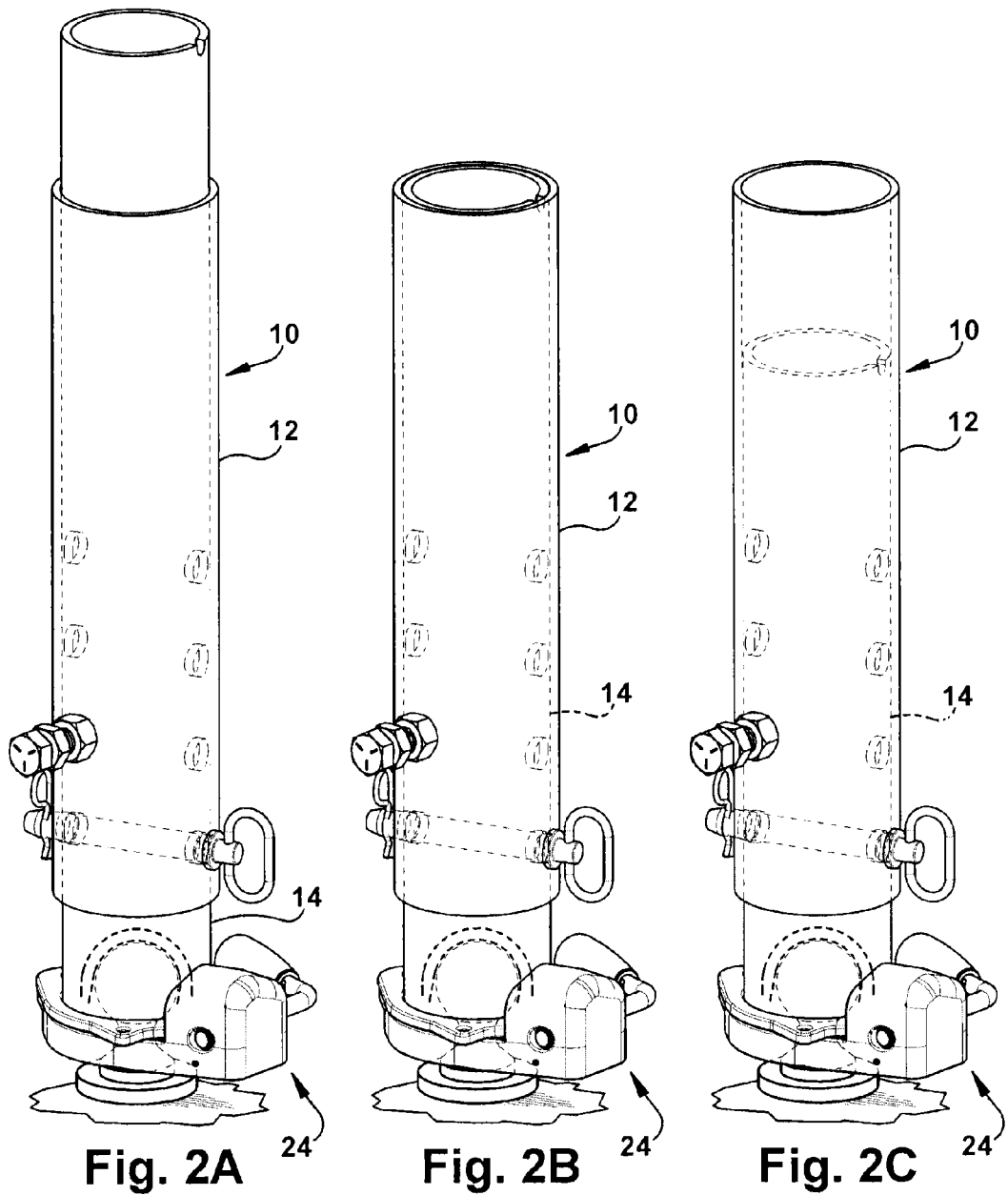

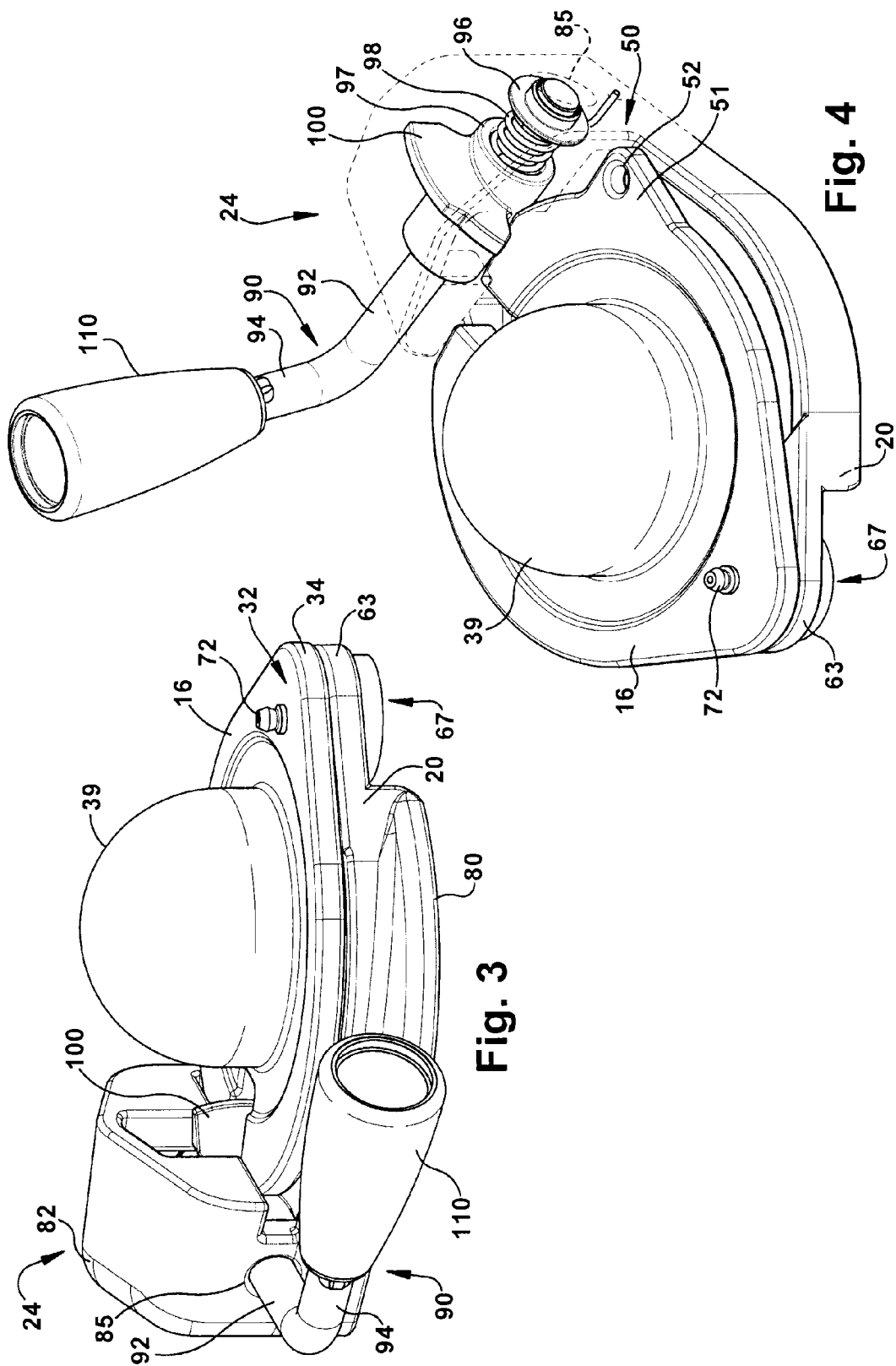

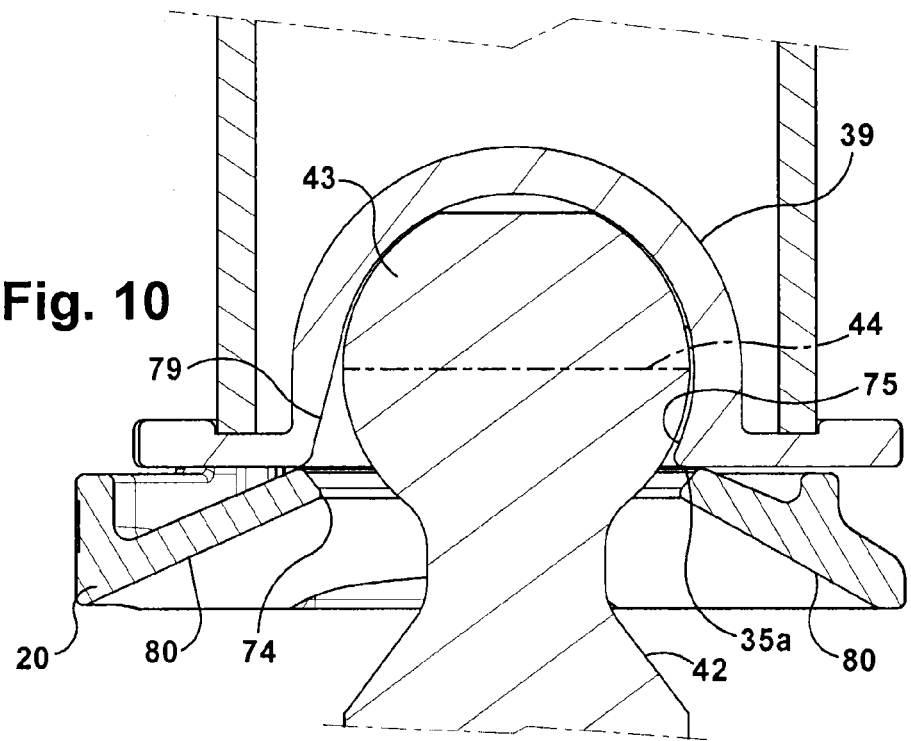
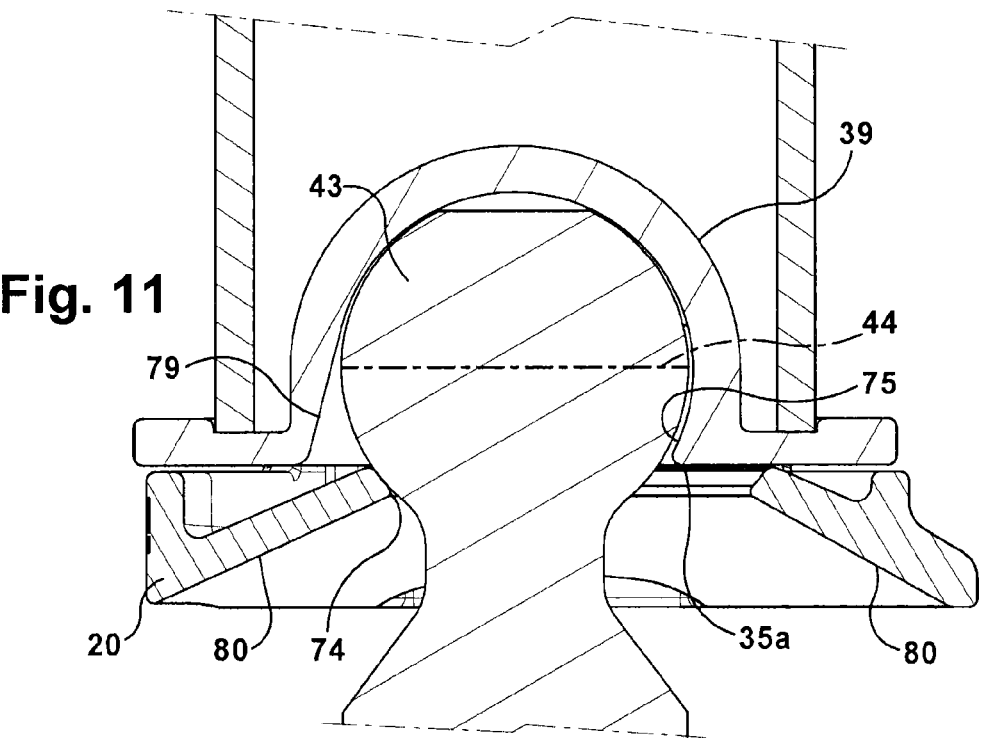

GOOSENECK COUPLER WITH SLIDEABLE LOCKING MEMBERS AND CLINCH

CROSS-REFERENCE TO RELATED APPLICATION

This application claims benefit from U.S. Provisional Patent Application No. 61/444,878 entitled "Gooseneck Coupler with Slideable Style Locking Plates," filed on Feb. 21, 2011, which is hereby incorporated in its entirety by reference.

FIELD OF THE INVENTION

The present invention is generally related to a coupler for securing a towed vehicle to a towing vehicle and, more particularly, to a gooseneck coupler with slideable style locking members with a clinch.

BACKGROUND

Many vehicles are designed to transport freight, goods, merchandise, personal property, and other large cargo. Often, these vehicles may be arranged to tow a towed vehicle, such as for example a trailer, by attaching the towed vehicle to the towing vehicle, such as through the use of some kind of hitch assembly. The towing industry has developed a number of methods and apparatuses for securing or engaging the towed vehicle to the towing vehicle, such as attaching a trailer to a pick-up truck.

There are many different types of trailer hitches in the art that may be attached to the towing vehicle in a variety of ways depending on the type of towed vehicle and towing vehicle involved. Some of the most common types of hitches include gooseneck, fifth wheel hitches, and rear mounted hitches. For example, towed vehicles may be connected to the towing vehicle by way of a hitch assembly that includes a ball hitch or member secured to the towing vehicle and a ball socket coupling mechanism on the towed vehicle that mounts over the hitch ball and thereby allows for the towed vehicle to pivot behind the towing vehicle.

Numerous types of hitch balls have been developed to be attached to the bumper or other rear portion of a towing vehicle. The towed vehicle may be equipped with a coupler mechanism to be attached to the towing vehicle by placing the coupler mechanism over the hitch ball and securing the coupler to the hitch ball. Similar apparatus using hitch receivers attached to the rear of the towing vehicle and drawbars may be used to secure towed vehicles to towing vehicles.

Some towed vehicles may be designed to carry heavy loads. Connecting such a towed vehicle to a ball hitch on a bumper of a towing vehicle, however, may be impractical. When a towed vehicle load is heavy as compared to the weight of the towing vehicle, applying the towed vehicle load generally over or in front of the rear axle of the towing vehicle may create a more desirable towing condition. In addition, such an arrangement may put much of the force of the towed vehicle load onto structural members of the towing vehicle, such as the frame, whereby the hitch ball may be located, for example, in the truck bed.

There are generally two arrangements for securing a towed vehicle to the bed of a towing vehicle—a fifth wheel hitch and a gooseneck hitch. A fifth wheel hitch may be utilized with towed vehicles having a king pin, which may be part of a pin box attached to the towed vehicle. Fifth wheel hitches may generally be attached in a bed of a truck or directly to the frame of the truck in a more permanent manner, whereby tools may generally be required to remove fasteners and other connectors to install or uninstall a fifth wheel hitch to the bed of a towing vehicle. A gooseneck hitch may be utilized with a towed vehicle having a gooseneck coupler that may generally be coupled to a hitch ball that may be located in the bed of the towing vehicle. The hitch ball may be permanently or removably secured to the frame or bed of the towing vehicle.

The towed vehicle coupler often has a socket portion that is sized and shaped to receive the hitch ball. The gooseneck coupler may engage the hitch ball to pivotally couple the towed vehicle to the towing vehicle. The gooseneck coupler to hitch ball connection may allow for relative movement between the towing vehicle and the towed vehicle as the towing vehicle makes turns, traverses uneven or rough terrain, and passes along inclining and declining roadways. The hitch ball member may be removed or lowered to a stowed position below the bed to ensure that the use of the bed is not substantially hindered by the presence of the ball.

The gooseneck coupler typically may include a manually operated clamping arrangement that may retain the ball member in the socket and, thus, the towed vehicle to the towing vehicle. This manually operated clamping arrangement, however, may be difficult to operate effectively. Therefore, there is a need for a gooseneck coupler with a clamping arrangement that is more efficient to use. Further, current manually operated gooseneck couplers include locking mechanisms that are cumbersome and may interfere with the operation of the telescoping tubes of a gooseneck coupler. Therefore, there is a need for a more efficient locking mechanism.

Additionally, prior art gooseneck couplers, so as to achieve adequate hitch ball retention, typically include sockets that are required to be of substantially the same depth as the height of the hitch ball. This causes the hitch ball to fit entirely within the socket. This may, therefore, result in the locking plate engaging the neck of the hitch ball, which may limit the angle of articulation of the gooseneck coupler. Therefore, there is a need for a gooseneck coupler that may be capable of overcoming these limitations.

SUMMARY

A gooseneck coupler for use with a towing vehicle towing a towed vehicle is disclosed. The gooseneck coupler may include a first member, and a second member pivotally attached to the first member, where the second member is capable of pivoting relative to the first member from a first position to a second position. The gooseneck coupler may also include an opening in the first member, the opening sized to receive a hitch ball, and a clinch mechanism located within the opening where the hitch ball is wedged between the clinch mechanism and the second member when the second member is in the second position relative to the first member.

In some embodiments, a gooseneck coupler may include a base plate, a locking plate pivotally attached to the base plate, an opening in the base plate, the opening sized to receive a hitch ball, and a clinch mechanism extending radially from the opening and extending a portion of a circumference of the opening. The gooseneck coupler may further include a locking mechanism rotatable from a locked position pivotally locking the locking plate relative to the base plate to secure engagement of the hitch ball between the locking plate and the clinch mechanism to an unlocked position allowing pivotal movement of the locking plate relative to the base plate to thereby release the locking plate and the clinch mechanism from engagement with the hitch ball.

In some embodiments, a gooseneck coupler may include a base plate, a locking plate pivotally attached to the base plate, an opening in the base plate, the opening sized to receive a hitch ball having a spherical portion, and a raised surface extending radially from the opening. The gooseneck coupler may also include a locking mechanism attached to the locking plate, where the locking mechanism is capable of securing the locking plate and raised surface in engagement with the spherical portion of the hitch ball.

BRIEF DESCRIPTION OF THE DRAWINGS

The invention may be better understood by reference to the following detailed description taken in connection with the following illustrations, wherein:

FIG. 2A is a perspective view of the gooseneck coupler of FIG. 1 in a retracted position.

FIG. 2B is a perspective view of another embodiment of the gooseneck coupler in a retracted position.

FIG. 2C is a perspective view of yet another embodiment of the gooseneck coupler in a retracted position.

FIG. 3 is a perspective view of a portion of the gooseneck coupler of FIG. 1 in a locked position.

FIG. 4 is a perspective view of a portion of the gooseneck coupler of FIG. 1 in an unlocked position.

FIG. 10 is a side cross-sectional view taken along line 10-10 of alternative embodiments of FIG. 8 with a hitch ball in phantom and the gooseneck coupler in the unlocked position.

FIG. 11 is a view of the alternative embodiments of FIG. 10 with the hitch ball in phantom and the gooseneck coupler in the locked position and FIG. 11A is a view of the alternative embodiments of FIG. 11 with the hitch ball in phantom and the gooseneck coupler in the locked position.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
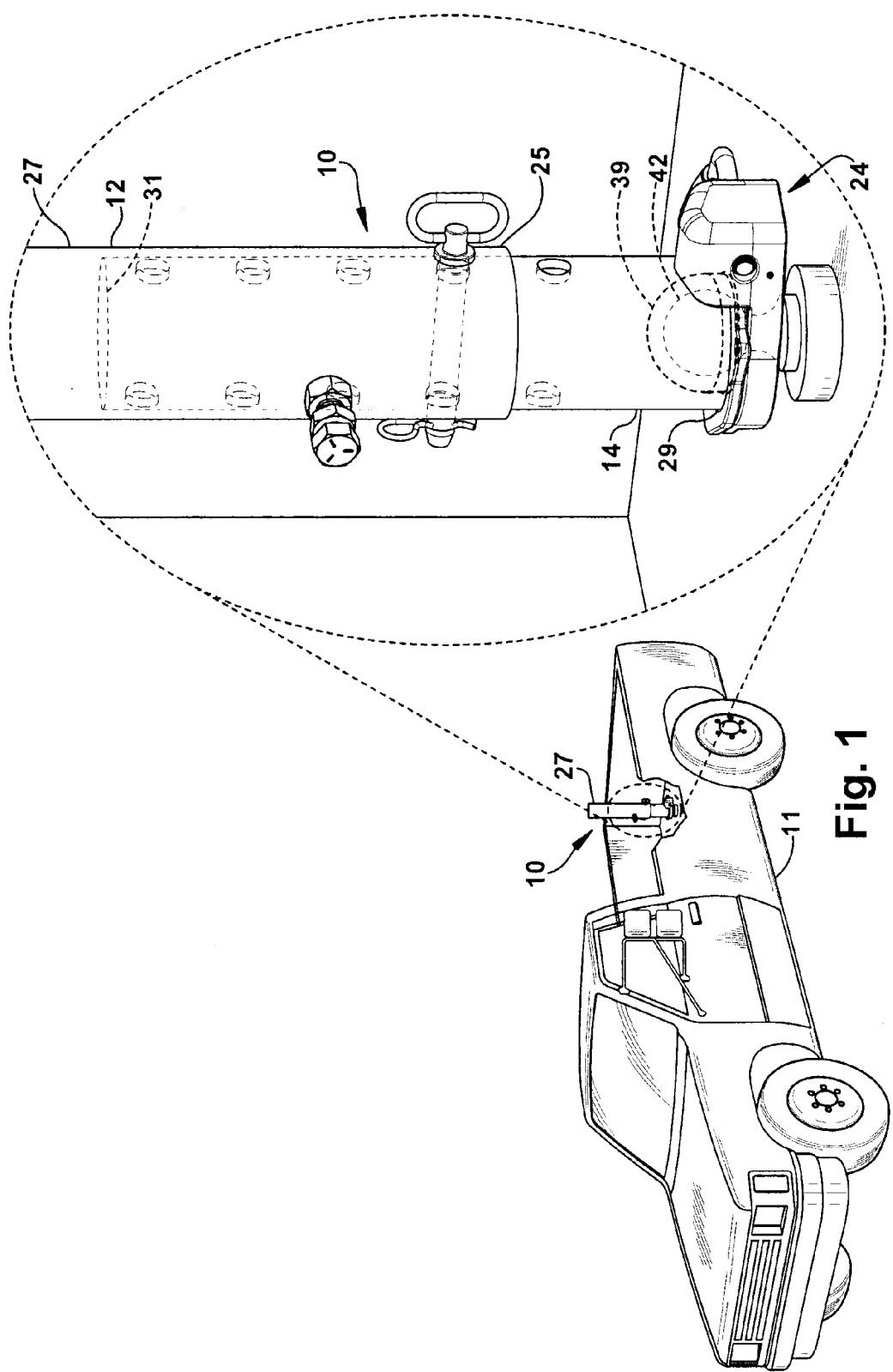
FIG. 1 is a perspective view of some embodiments of a gooseneck coupler in a non-limiting example attached to a towing vehicle in an extended position.

A gooseneck coupler 10 is illustrated in FIGS. 1-9. The gooseneck coupler 10 may be configured to be secured to a towed vehicle, such as a trailer (not shown) and to engage a towing vehicle 11, such as a truck, as shown in FIG. 1. The gooseneck coupler 10 may be of any appropriate shape, size, type or configuration. The gooseneck coupler 10 may include an outer tube 12, an inner tube 14, a base plate 16, a locking plate 20, and a locking mechanism 24. In some embodiments, gooseneck coupler 10 may include a single tube in lieu of the inner and outer tubes.

The outer tube 12 may be of any appropriate shape, size, type or configuration, such as of a generally cylindrical or rectangular tubular configuration. In an exemplary embodiment shown, the outer tube 12 is shown as a generally cylindrical tubular configuration. The outer tube 12 may be located at any appropriate position on the gooseneck coupler 10, such as outside of and surrounding the inner tube 14. For example, the outer tube 12 may be of a slightly larger interior dimension than an exterior dimension of the inner tube 14. The outer tube 12 further includes a first end 25 and a second end 27. The second end 27 of the outer tube 12 may attach to the towed vehicle in a variety of variations.

The inner tube 14 may be of any appropriate shape, size, type or configuration, such as of a generally cylindrical or rectangular tubular configuration. For example, the inner tube 14 may be of a correspondingly similar shape as that of the outer tube 12 such that the inner tube 14 telescopingly engages the outer tube 12. In the exemplary embodiment shown, the inner tube 14 is shown as a generally cylindrical tubular configuration. The inner tube 14 may be of a slightly smaller exterior dimension than an interior dimension of the outer tube 12. The inner tube 14 may be located at any appropriate position on the gooseneck coupler 10, such as located within a portion of the outer tube 12 and may be positionable from a retracted position, such as that shown in FIG. 2A, to an extended position, such as that shown in FIG. 1. In one exemplary embodiment, the inner tube 14 may only extend a portion of the height of the outer tube 12 when the inner tube 14 is in the fully retracted position, such as that shown in FIG. 2C. In an alternative embodiment, the inner tube 14 may be of substantially the same height as the outer tube 12 when the inner tube 14 is in the fully retracted position, such as that shown in FIG. 2B. In yet another alternative embodiment, the inner tube 14 may extend beyond the height of the outer tube 12 when the inner tube 14 is in the fully retracted position, such as that shown in FIG. 2A.

As further shown in the drawings, the inner tube 14 includes a first end 29 and a second end 31. The inner tube 14 may be attached to the base plate 16 at the first end 29 such as by welding, attaching using fasteners, integrally forming the inner tube 14 and the base plate 16 such as by forging or casting, or any other attachment process. The second end 31 of the inner tube 14 extends into the outer tube 12 as described above.

Figure 5:
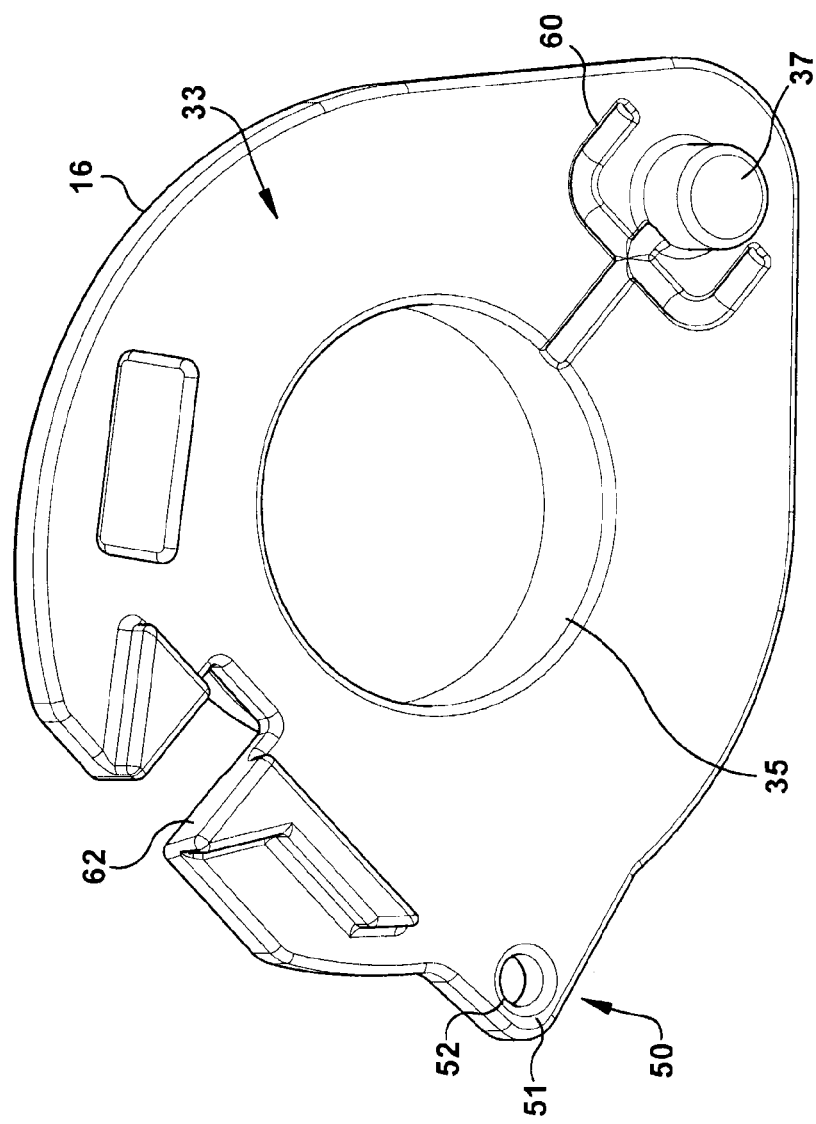
FIG. 5 is a perspective view of a bottom surface of a base plate of the gooseneck coupler of FIG. 1.
Figure 6:
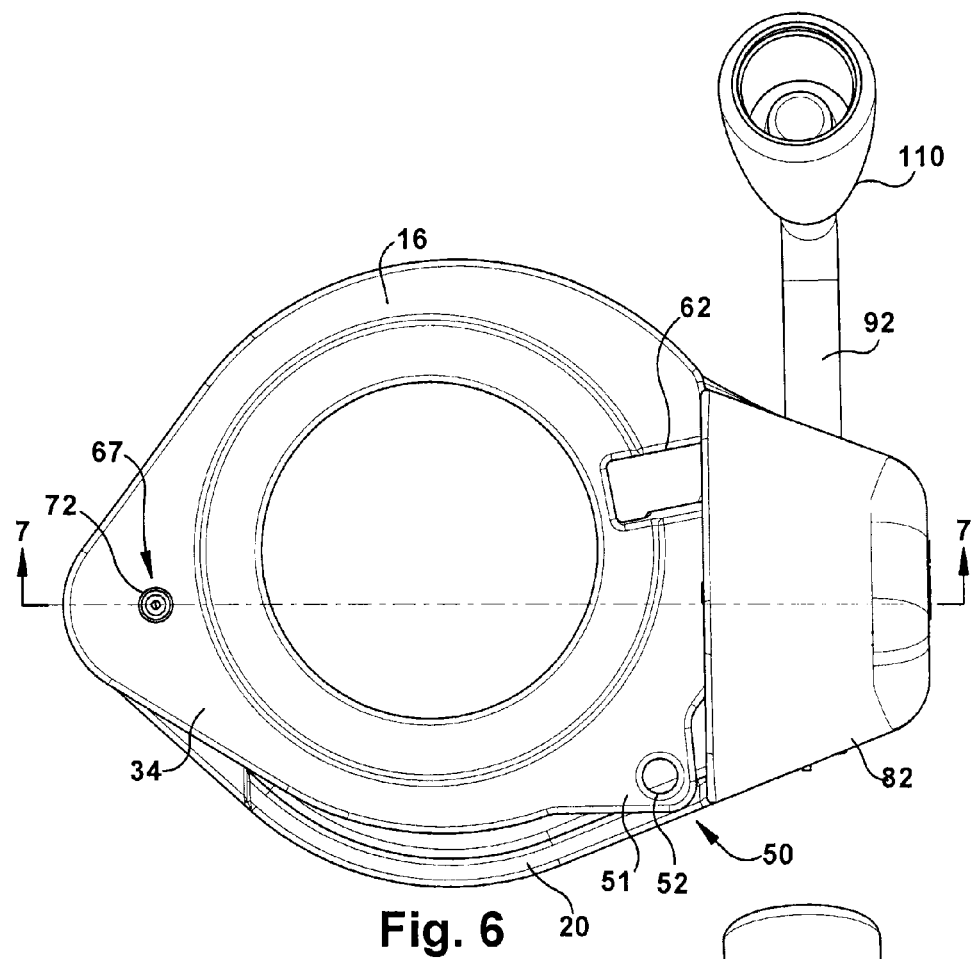
FIG. 6 is a top view of the portion of the gooseneck coupler of FIG. 1.

The base plate 16 may be of any appropriate shape, size, type or configuration, such as of a generally ovular configuration as shown in FIG. 5, or a generally rectangular configuration. The base plate 16 may have an upper surface 32 and a lower surface 33. In the exemplary embodiment shown, the inner tube 14 is attached to the upper surface 32 of the base plate 16. The base plate 16 may further include an extension portion 34. The extension portion 34 may provide additional material to attach the base plate 16 to the locking plate 20 as further described below. Additionally, the base plate 16 may include a pivotal male extension 37 to pivotally attach the locking plate 20 with the base plate 16. In an exemplary embodiment, the pivotal male extension 37 may be integrally formed with the base plate 16. More specifically, the locking plate 20 may include an aperture 38 shaped and sized to receive the pivotal male extension 37 therein to pivotally attach the locking plate 20 and the base plate 16. In some embodiments however, pivotal male extension 37 may be a component separate from base plate 16, such as a pivot pin or the like.

The base plate 16 may further include an opening 35. The opening 35 may be of any appropriate shape, size, type or configuration, such as a generally circular shape shown in FIG. 5. The opening 35 may be located at any appropriate position on the base plate 16, such as at an approximate central location on the base plate 16 as shown in the exemplary embodiment. The base plate 16 may further include a socket 39 that may be positioned directly over the opening 35 such that the opening 35 may provide access to the socket 39.

The socket 39 may be of any appropriate shape, size, type or configuration, such as of a generally semi-spherical shape as shown in the exemplary embodiment of FIGS. 1-4 and 6-9. For example, the socket 39 may be of a shape and size to receive a hitch ball 42, which may be attached to a towing vehicle in a conventional manner, within the socket 39. The hitch ball 42 may include a spherical portion 43 and a centerline 44. The socket 39 may be located at any appropriate position, such as adjacent the opening 35 of the base plate 16 and adjacent the first end 29 of the inner tube 14. The socket 39 may be secured to the base plate 16 by any appropriate means, such as by welding, or the like. While the base plate 16 and socket 39 may be shown as separate components, it is to be understood that the base plate 16 and socket 39 may be fabricated as a single integral piece and should not be limited to that shown or described herein.

The base plate 16 may further include a single point lockable device 50. The lockable device 50 may comprise an integrally formed ear 51 that includes an aperture 52 through the entire thickness of the ear 51 and more specifically through the entire thickness of the base plate 16. The ear 51 and aperture 52 may be positioned on the base plate 16 such that a lock (not shown), such as a standard padlock or the like, is insertable through the aperture 52 to prevent the locking plate 20 from being moved or otherwise moving from the locked position. More specifically, the lock (not shown) may be inserted through the aperture 52, which prevents the locking plate 20 from pivoting relative to the base plate 16 to keep the gooseneck coupler 10 in the locked position either preventing the gooseneck coupler 10 from being removed from the hitch ball 42 or preventing the gooseneck coupler 10 from being inserted onto the hitch ball 42, as is applicable.

The base plate 16 may further include at least one lubrication track 60 located in the lower surface 33 of the base plate 16. The lubrication track 60 may be integrally formed into the base plate 16, or alternatively, by way of a non-limiting example, made be formed in the base plate 16 such as by machining it therein. As shown in an exemplary embodiment, the base plate 16 includes a lubrication track 60 that allows lubricant, such as oil, grease, or the like to enter into the ball socket 39, and more specifically enter at the location where the ball socket 39 rests on the hitch ball 42. The lubrication track 60 may also allow lubricant to enter the location where the base plate 16 and the locking plate 20 pivot, as further described below. Adding the lubricant into the lubrication track 60 may make it easier to move the gooseneck coupler 10 from the unlocked position to the locked position and vice versa when applying a lateral force to the gooseneck coupler 10. In addition, the lubricant may be added through the lubrication tracks 60 to reduce the occurrence of rusting of the gooseneck coupler 10, especially at the pivot of the base plate 16 and the locking plate 20 and the engagement between the hitch ball 42 and the socket 39.

The base plate 16 may include a slot 62. The slot 62 may be positioned in proximity to the locking mechanism 24 such that when the gooseneck coupler 10 is in the locked position, the locking mechanism 24 engages the slot 62 as more fully described below. The slot 62 may be integrally formed with the base plate 16 or may be formed therein such as by machining the slot 62 into the base plate 16 after formation of the base plate 16, by way of a non-limiting example.

The locking plate 20 may be of any appropriate shape, size, type or configuration, such as of a generally ovular or rectangular configuration. For example, the locking plate 20 may be of a similar shape and size as that of the base plate 16 and may likewise include an extension portion 63. The locking plate 20 may be located at any appropriate position on the gooseneck coupler 10, such as adjacent base plate 16. For example, the locking plate 20 may be located in pivoting engagement with the base plate 16 and in particular to the underside 33 of the base plate 16. More specifically, the locking plate 20 may be pivotably connected to the base plate 16 at a pivot 67. The pivot 67 may be located on the extension portion 34 of the base plate 16 and the extension portion 63 of the locking plate 20 as is shown in FIGS. 3 and 4.

Base plate 16 may include a lubrication fitting 72, such as that shown in FIGS. 3, 4 and 6-9. The lubrication fitting 72 may allow lubricant to be added to the pivot 67 and into lubrication track 60, which may make it easier to move the locking plate 20 relative to the base plate 16 when a lateral force is applied to unlock and/or lock the gooseneck coupler 10. In addition, the lubricant may reduce the occurrence of rusting of the gooseneck coupler 10 at the pivot 67. The combination of the lubrication fitting 72 and the lubrication track 60 may provide the opportunity to lubricate the gooseneck coupler 10, which may extend the life of the gooseneck coupler 10 and may make it easier to actuate the moving parts so lubricated.

Figure 7:
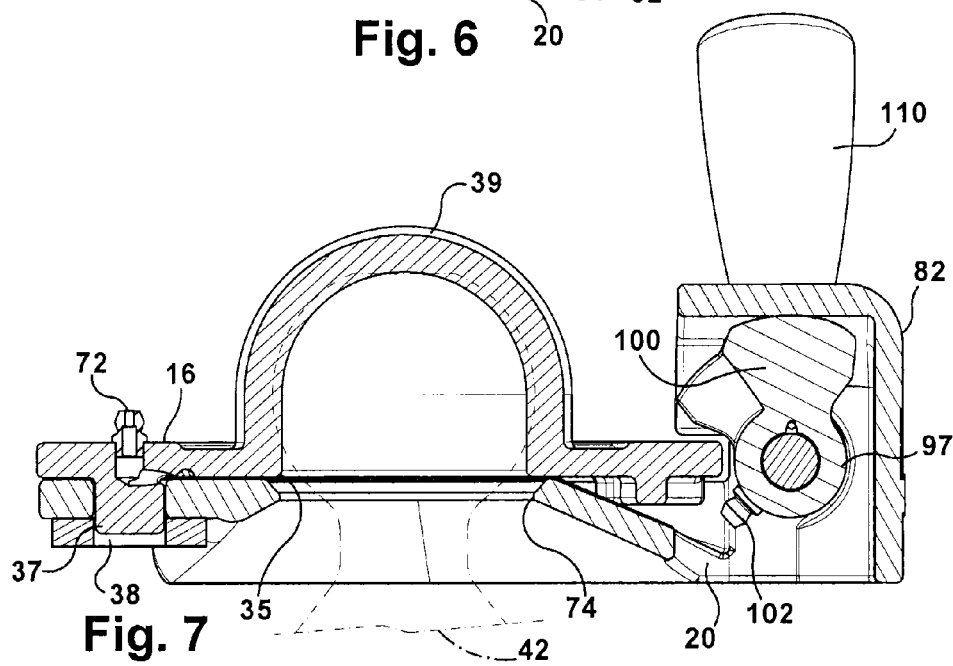
FIG. 7 is a cross-sectional front view taken along line 7-7 of FIG. 6 with a hitch ball in phantom.
Figure 8:
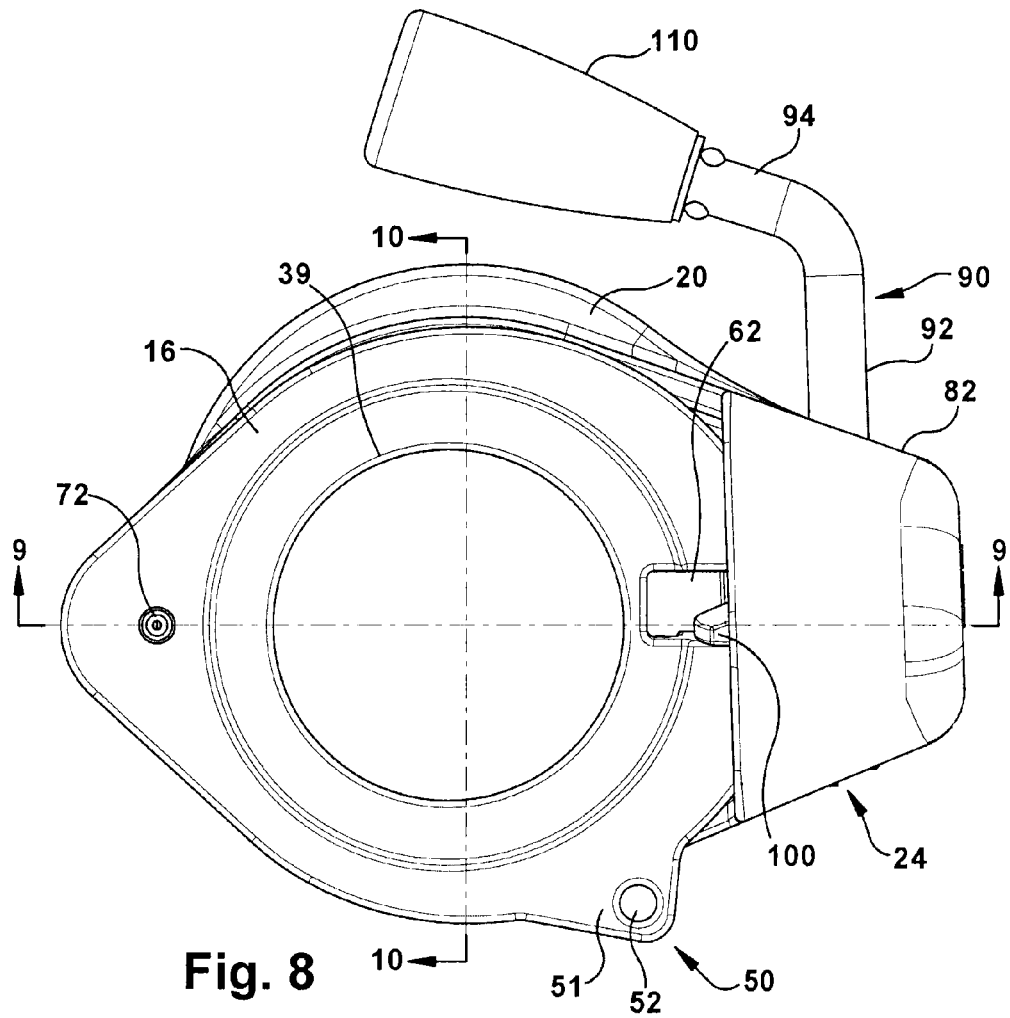
FIG. 8 is top view of the portion of the gooseneck coupler of FIG. 1.
Figure 9:
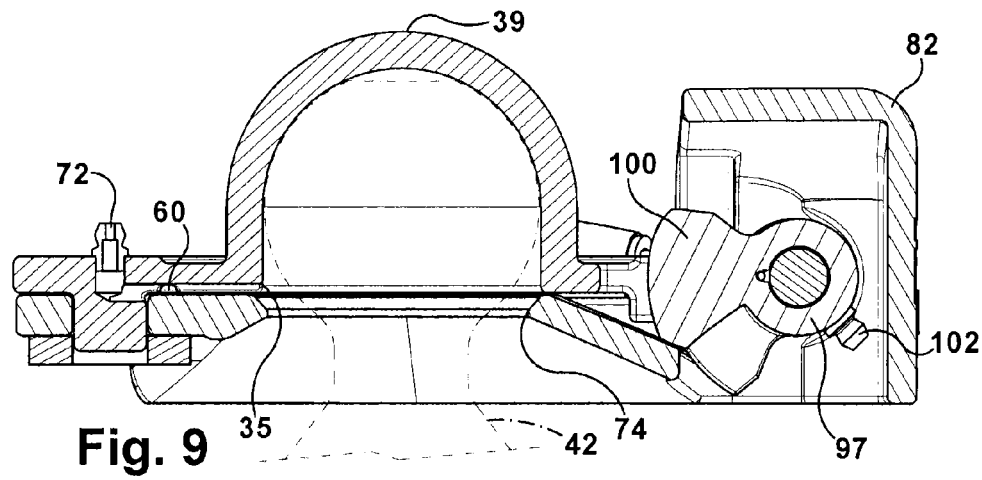
FIG. 9 is a cross-sectional front view taken along line 9-9 of FIG. 8 with a hitch ball in phantom.

The locking plate 20 may include a hitch ball opening 74. The hitch ball opening 74 may be of any appropriate shape, size, type or configuration, such as of a generally circular shape as shown in FIGS. 7 and 9. For example, the hitch ball opening 74 may be of a similar shape and size as that of the opening 35 in the base plate 16. The hitch ball opening 74 may be located at any appropriate position on the locking plate 20, such as at an approximate central location on the locking plate 20, whereby the hitch ball opening 74 may generally align with the opening 35 in the base plate 16 when the base plate 16 and locking plate 20 are pivotably attached and are in the unlocked position.

In some embodiments, the hitch ball opening 74 may be a continuous opening in locking plate 20 (wherein the opening 74 may have a continuous perimeter that defines the opening 74) or a discontinuous opening 74 such as a recess, slot or other surface feature on a perimeter or side of locking plate 20. In some embodiments, locking plate 20 may be generally blade shaped with a surface feature on the periphery, such as a recess, slot or the like, that may generally align with the opening 35 in base plate 16 and may be capable of engaging a portion of the hitch ball 42 when in the locked or engaged position.

This alignment of the opening 35 in the base plate 16 and the hitch ball opening 74 of the locking plate 20 may provide an entrance for the hitch ball 42 to enter into the socket 39 of the base plate 16. The hitch ball 42 of the towing vehicle may generally be located within and abut the socket 39 during engagement of the gooseneck coupler 10 and the towed vehicle.

In some embodiments, such as that shown in FIGS. 10-21, the base plate 16 may further include a clinch 75 positioned on a circumference 76 at or adjacent to the opening 35a to the socket 39. Clinch 75 may extend radially inwardly. In these embodiments, when the gooseneck coupler 10 is in the locked position, the hitch ball 42 is wedgingly engaged between the clinch 75 and the locking plate 20. In these embodiments, the clinch 75 may help balance the forces with the portion of the locking plate 20 that engages the hitch ball 42. Specifically when the clinch 75 and the locking plate 20 engage the hitch ball 42 the load applied to the gooseneck coupler 10 by the towed vehicle and the towing vehicle 11 may be transferred between both the locking plate 20 and through the clinch 75 and up into the inner tube 14. It is, therefore, possible that less load may be applied to the locking plate 20 during operation.

Figure 11A:
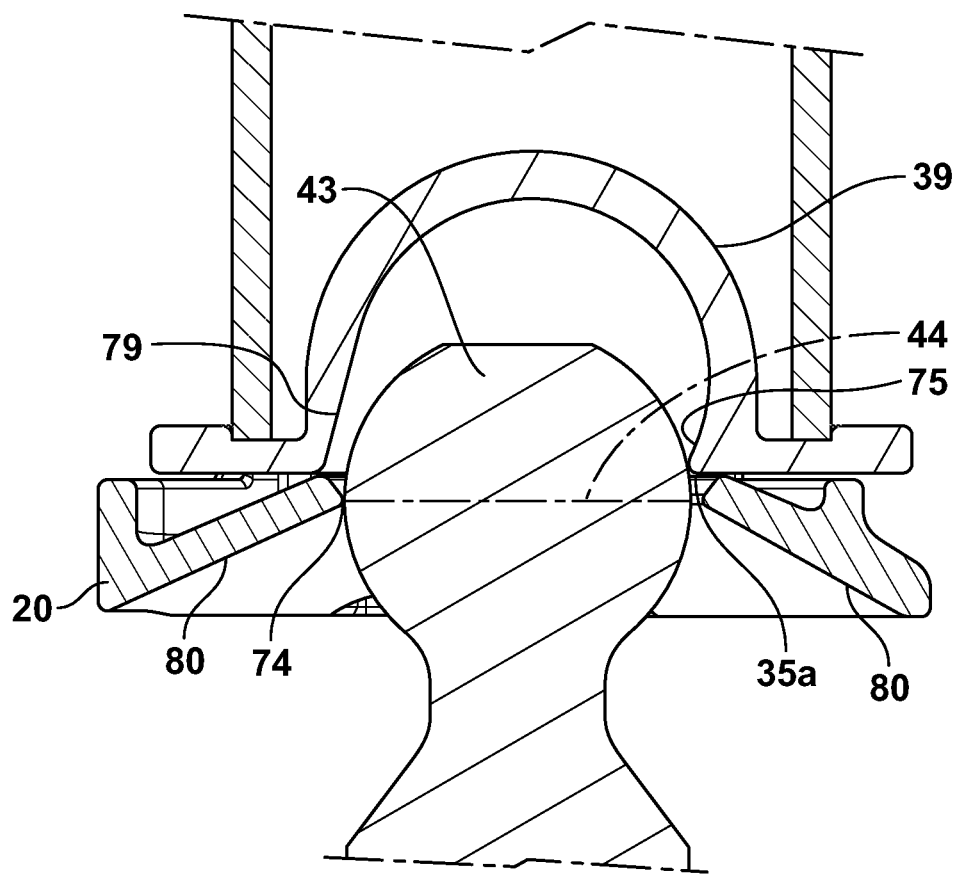
Figure 12:
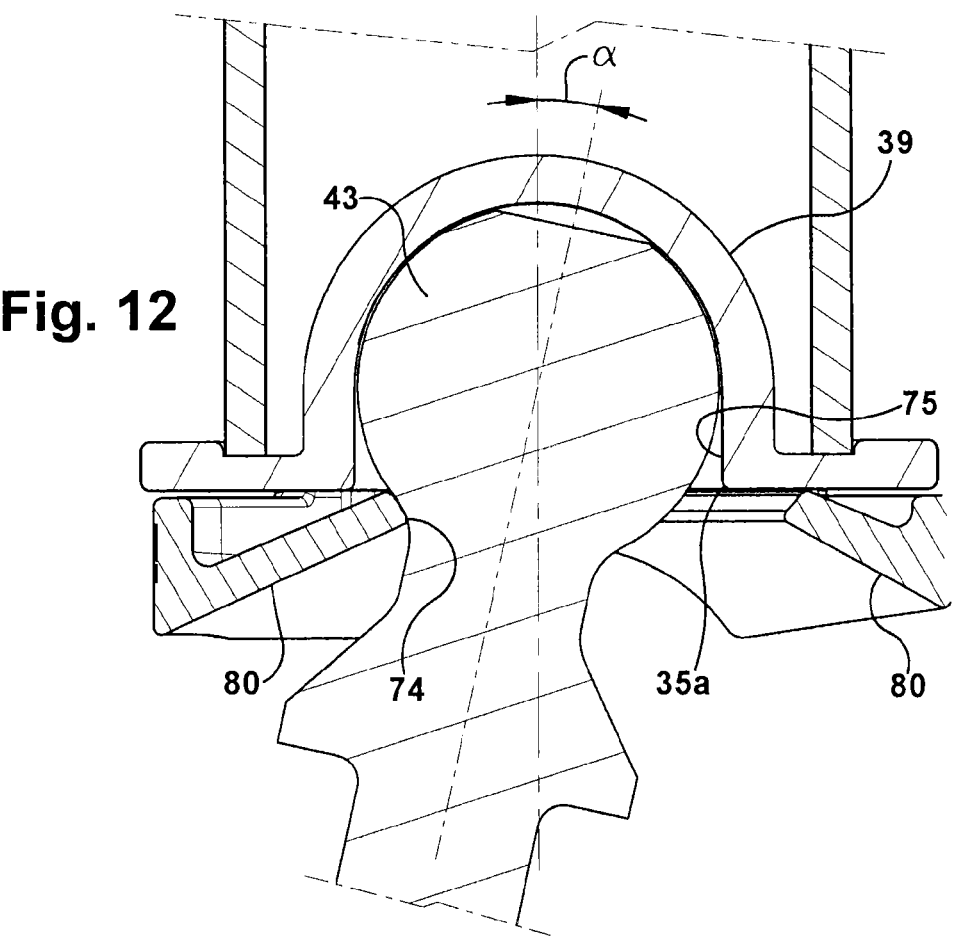
FIG. 12 is a view of the alternative embodiments of FIG. 11 with the hitch ball in phantom and the gooseneck coupler in the locked position.
Figure 13:
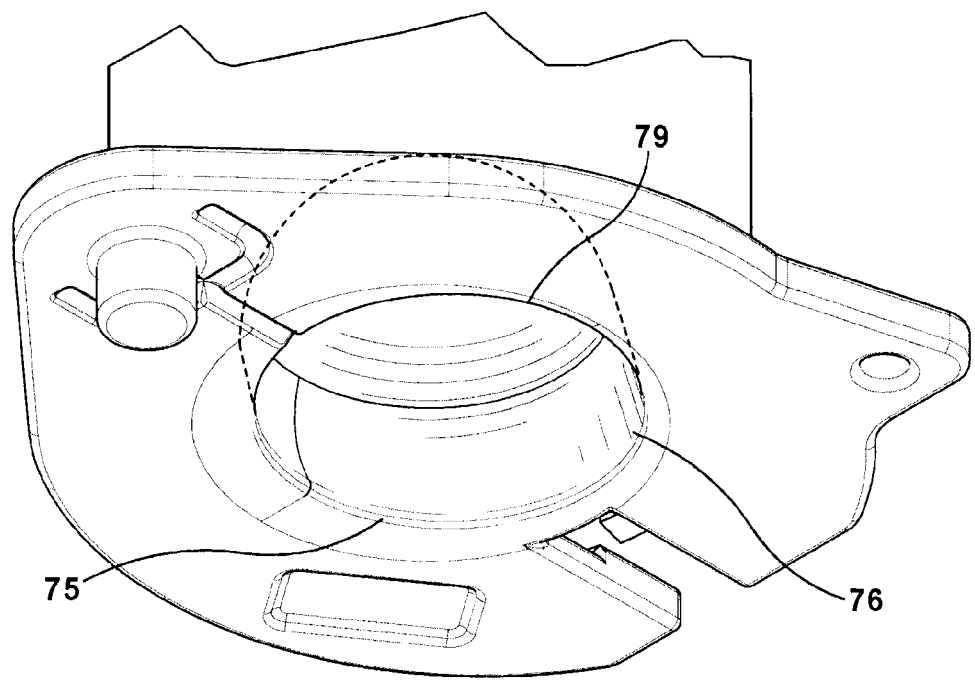
FIG. 13 is a perspective view of a portion of some other embodiments of a gooseneck coupler.
Figure 14:
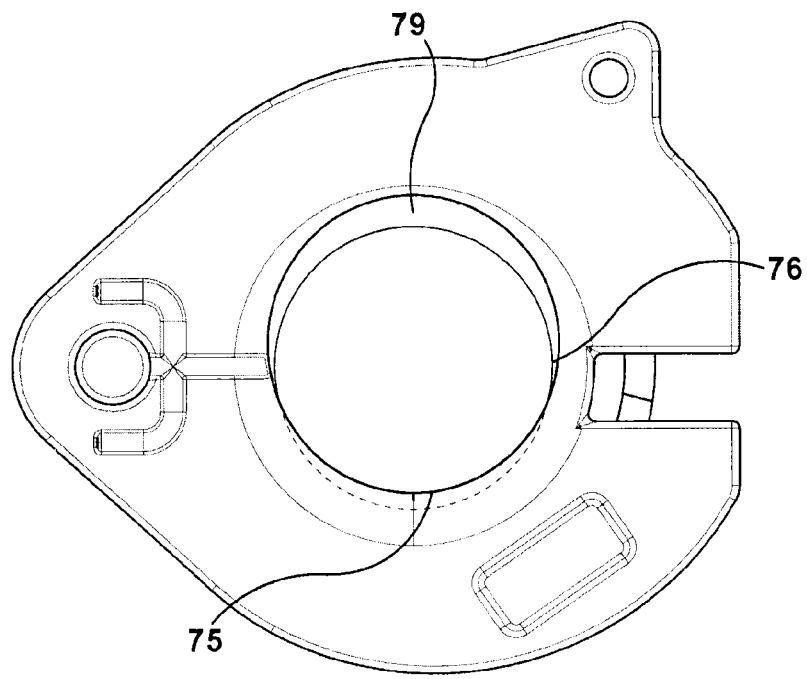
FIG. 14 is a bottom view of the other embodiments of the gooseneck coupler of FIG. 13.
Figure 15:
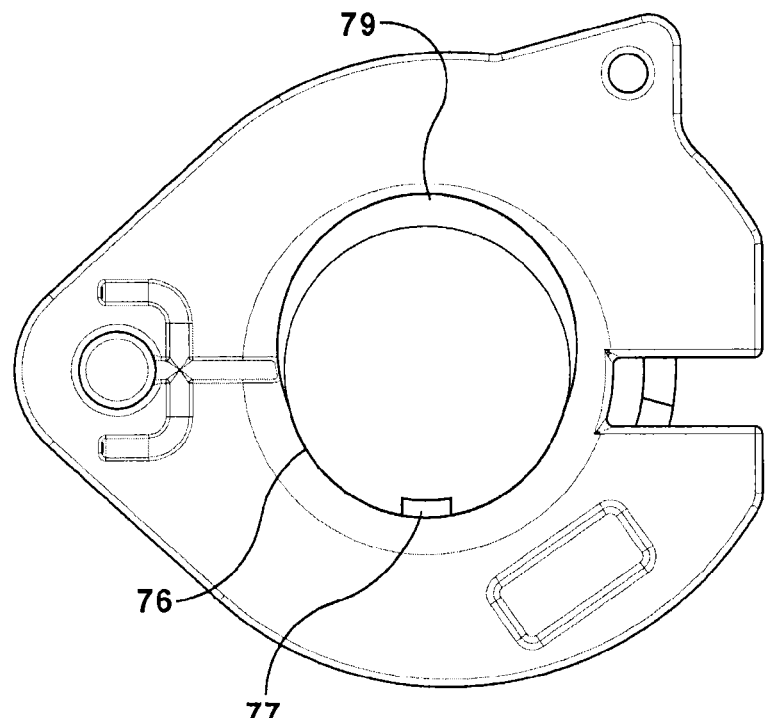
FIG. 15 is a bottom view of a portion of other embodiments of a gooseneck coupler.

Specifically in some of the embodiments, the clinch 75 may be positioned within the opening 35a of the socket 39 such that the clinch 75 and the locking plate 20 may engage the hitch ball 42 along a portion of the spherical part 43 of the hitch ball 42, as is shown for example in FIG. 11. By way of a non-limiting example, the clinch 75 and the locking plate 20 may engage the hitch ball 42 at or on a location below the hemispherical centerline 44 of the hitch ball 42, as shown for example in FIG. 11. In addition, the clinch 75 and the locking plate 20 may engage the hitch ball 42 at the hemispherical centerline 44 of the hitch ball 42, as shown for example in FIG. 11A. In these embodiments, the locking plate 20 and the clinch 75 engaging the hitch ball 42 on the spherical portion 43 thereof may allow for the socket 39 to be of a less depth than other prior art sockets. The present embodiments may allow for a shallower socket 39 wherein the clinch 75 and the locking plate 20 may engage the spherical portion 43 of the hitch ball 42 while being able to appropriately secure the hitch ball 42 with the clinch 75 and locking plate 20. The engagement of the hitch ball 42 on the spherical portion 43 thereof may permit a larger articulation angle $\alpha$ of the gooseneck coupler 10, which in turn may allow for more articulation between the towed vehicle and towing vehicle 11 while appropriately retaining the hitch ball 42 with the clinch 75 and locking plate 20. By way of a non-limiting example, the articulation angle $\alpha$ of the gooseneck coupler 10 of the present embodiments may be between approximately 1 and 18 degrees, as shown for example in FIG. 12, while the engagement of the hitch ball 42, the locking plate 20 and clinch 75 remains tight.

In operation of the gooseneck coupler 10 of the present embodiments, the hitch ball 42 may be inserted through the opening 35a into the socket 39 while the locking mechanism 24 is in the unlocked position, as is shown for example in FIG. 10. The locking plate 20 may then be pivoted relative to the base plate 16. The hitch ball 42 may then be wedgingly engaged between the locking plate 20 and the clinch 75 as is shown in FIG. 11. The locking mechanism 24 may then be positioned to the locking position securing the hitch ball 42 into wedging engagement between the locking plate 20 and the clinch 75. The clinch 75 may further impede the removal of the hitch ball 42 while the gooseneck coupler 10 is in the locked position.

Figure 21:
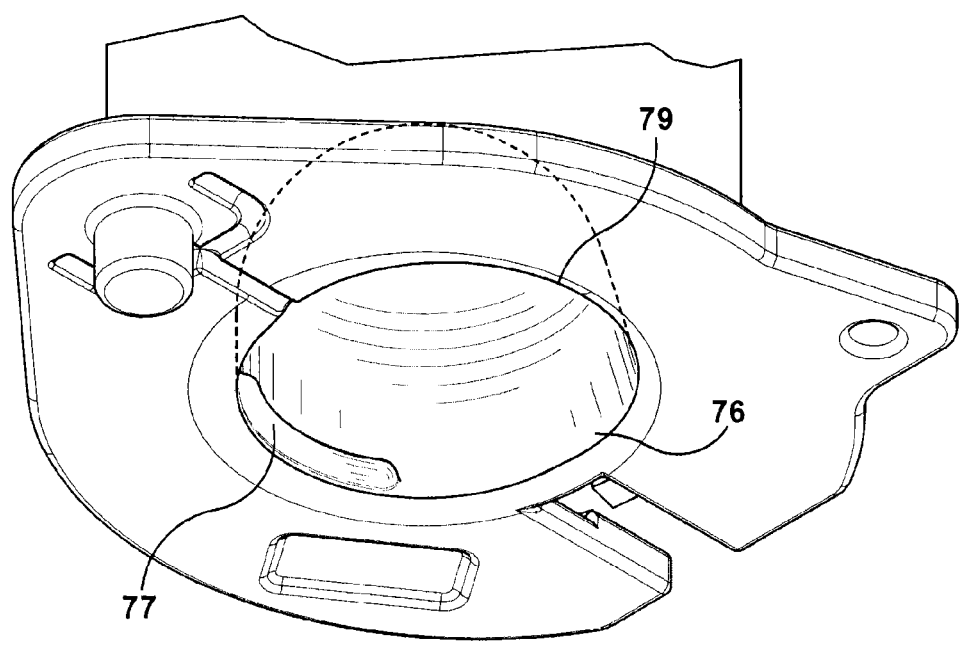
FIG. 21 is a perspective view of a portion of other embodiments of a gooseneck coupler.

In some embodiments, the clinch 75 may comprise a continuous raised surface 77 positioned on a circumference 76 of the opening 35a of the socket 39, such as shown for example in FIG. 21. In some embodiments, the raised surface 77 may be a continuous surface that extends almost one-half of the circumference of the opening 35a. Alternatively, the raised surface 77 may extend between one-half and one-third of the circumference 76 of the opening 35a. In some embodiments, the raised surface 77 may extend less than one-third of the circumference 76 of the opening 35a, including, by way of a non-limiting example being a single point such as a nub 77a, such as that shown in FIG. 15. In these embodiments, the raised surface 77 may be integrally formed with the base plate 16 and socket 39 such that the raised surface 77 may be cast, forged, or the like with the base plate 16 and/or socket 39. Alternatively, the raised surface 77 may be non-removably attached to the opening 35a of the base plate 16 such as by adding a weld bead 77b, such as that shown in FIG. 18, welding an attachment device, or the like. The raised surface 76 may be a detachable feature that may be fastened to the opening 35a of the base plate 16, such as for example shown in FIG. 19. By way of a non-limiting example, a fastener 83 may be used to attach the detachable feature such that it may be removed and attached by an operator.

Figure 16:
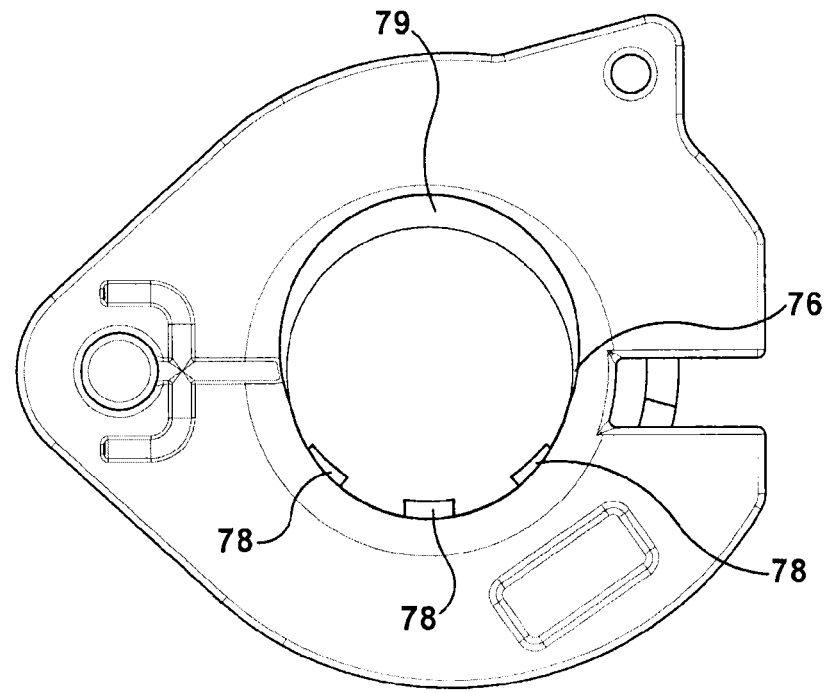
FIG. 16 is a bottom view of a portion of other embodiments of a gooseneck coupler.
Figure 17:
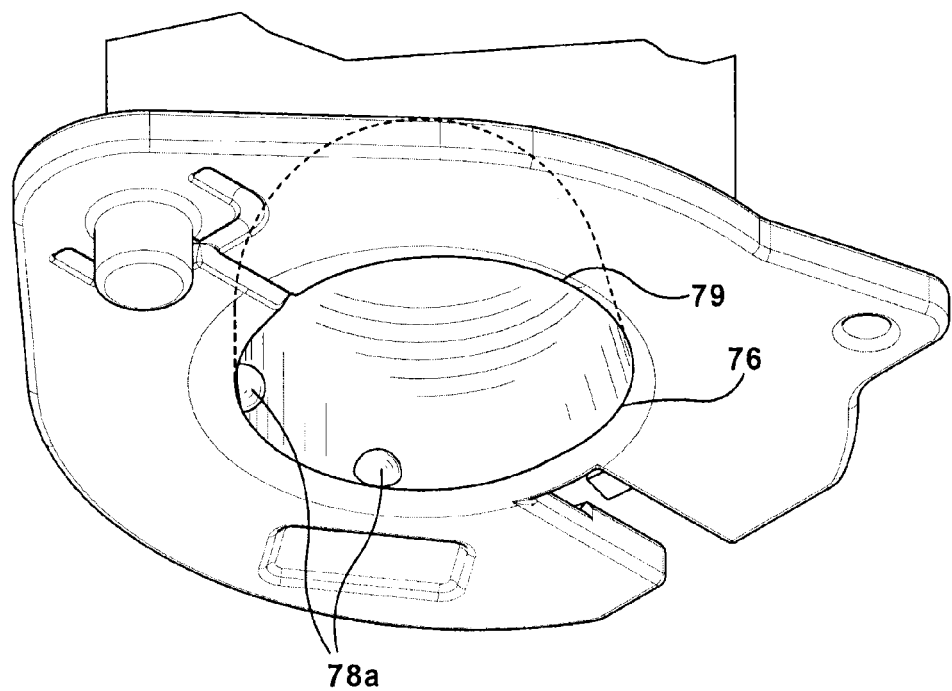
FIG. 17 is a perspective view of a portion of other embodiments of a gooseneck coupler.
Figure 18:
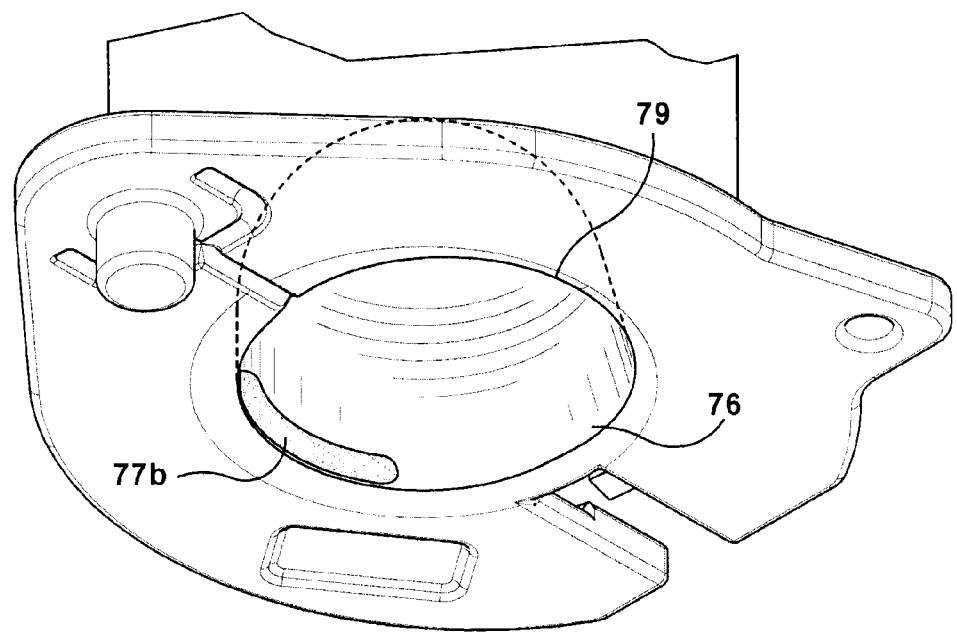
FIG. 18 is a perspective view of a portion of other embodiments of a gooseneck coupler.
Figure 19:
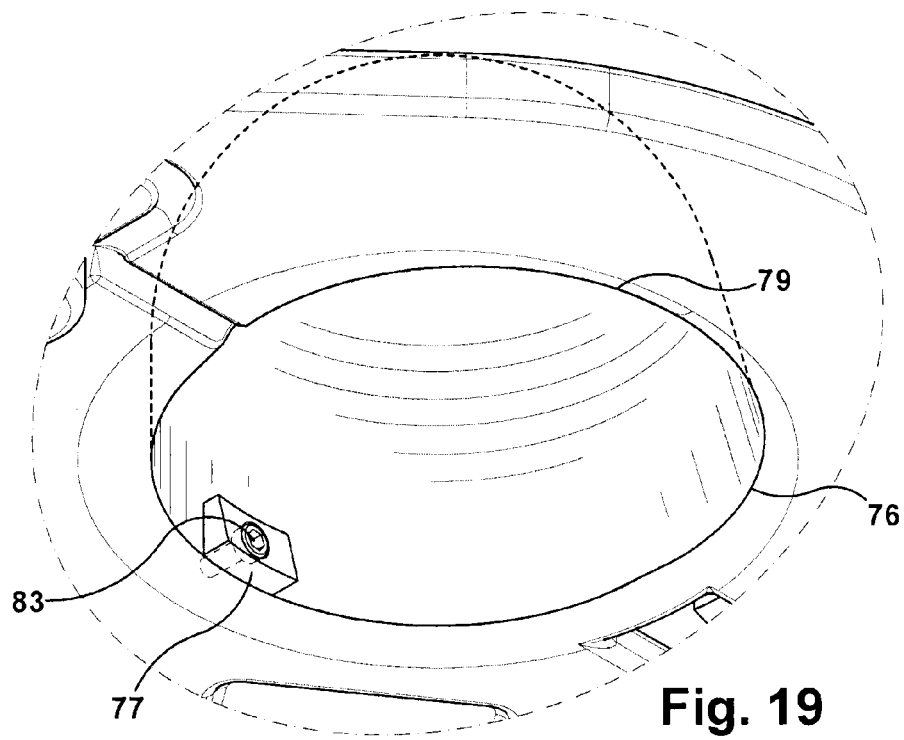
FIG. 19 is a perspective view of a portion of other embodiments of a gooseneck coupler.
Figure 20:
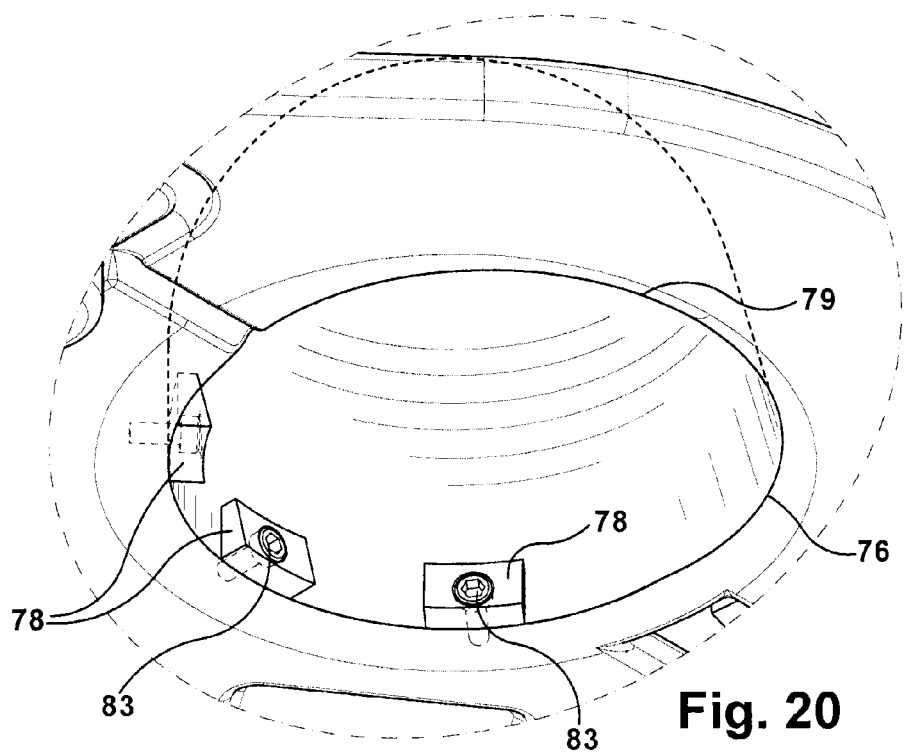
FIG. 20 is a perspective view of a portion of other embodiments of a gooseneck coupler.

In some embodiments, such as those shown in FIGS. 16 and 17, the clinch 75 may comprise a plurality of discontinuous raised surfaces 78, such as by way of a non-limiting example, the plurality of discontinuous raised surfaces 78 may comprise a plurality of nubs 78a positioned on the circumference 76 of the opening 35a of the base plate 16. In these embodiments, the discontinuous raised surfaces 78 may be spaced along the circumference of the opening 35a. The discontinuous raised surface 78 may be spaced uniformly or alternatively may be randomly positioned along the circumference 76 of the opening 35a and may take any appropriate shape or size. Any number of such discontinuous raised surfaces 78 may be used. The plurality of discontinuous raised surfaces 78 may extend almost one-half of the circumference 76 of the opening 35a. Alternatively, the plurality of discontinuous raised surfaces 78 may extend between one-half and one-third of the circumference 76 of the opening 35a. In other embodiments, the plurality of discontinuous raised surfaces 78 may extend less than one-third of the circumference 76 of the opening 35a. Any number of such discontinuous raised surfaces 78 may be used. In these embodiments, the discontinuous raised surfaces 78 may be integrally formed with the base plate 16 and/or socket 39 such that the discontinuous raised surfaces 78 are cast, forged, or the like with the base plate 16 and/or socket 39. Alternatively, the discontinuous raised surfaces 78 may be non-removably attached to the opening 35a of the base plate 16 such as by using a plurality of weld beads, welding an attachment device, or the like. The discontinuous raised surfaces 78 may be a detachable feature that may be fastened to the opening 35a of the base plate 16, as is shown for example in FIG. 20. By way of a non-limiting example, a fastener 83 may be used to attach the detachable feature such that it may be removed and attached by an operator.

In the embodiments set forth above, the clinch 75 may, by way of a non-limiting example, extend radially inwardly from the circumference of the opening 35a (or adjacent thereto) of the base plate 16 between approximately one-sixteenth and one-quarter of an inch. In one embodiment, the clinch 75 may extend radially approximately three-sixteenth an inch from the circumference of the opening 35a of the base plate 16.

In association with the clinch 75, the opening 35a may include a recess 79 positioned laterally opposed the opening 35a from the clinch 75. The recess 79 may be sized substantially the same as the clinch 75 such that the opening 35a of these embodiments are of substantially the same size of the opening 35 so as to not limit entry of the hitch ball 42 into the socket 39. In the embodiments in which the clinch 75 comprises a continuous raised surface 77 positioned on a circumference 76 of the opening 35a of the socket 39, the recess 79 may be of substantially the same size as that of the continuous raised surface 77. By way of a non-limiting example, if the continuous raised surface 77 extends approximately one-half of the circumference 76 of the opening 35a, the recess 79 may similarly extend approximately one-half of the circumference 76 of the opening 35a. Alternatively, if the clinch 75 comprises a plurality of discontinuous raised surfaces 78 that extends between approximately one-half to one-third of the circumference 76 of the opening 35a, the recess 79 may likewise extend between approximately one-half to one-third of the circumference 76 of the opening 35a. In other embodiments, the recess 79 may remain constant while the clinch 75 may vary such as for example in the embodiment in which the clinch 75 is removably attachable. In other embodiments, the recess 79 may extend along more of the circumference 76 of the opening 35a then the clinch 75. For example, the recess 79 may extend approximately one-half of the circumference 76 of the opening 35a whereas the clinch 75 may extend approximately one-third of the circumference 76 of the opening 35a.

The locking plate 20 may be of a shape and size to include a symmetric entry distended surface 80. In particular, the distended surface 80 may be shaped so that it extends as a funnel out from the hitch ball opening 74 of the locking plate 20 to create a larger surface, which may make it easier to install the hitch ball 42 through the hitch ball opening 74, through the opening 35 (or 35a), and into the socket 39. For example, when the gooseneck coupler 10 is lowered onto the hitch ball 42 the distended surface 80 creates a big target such that any minor misalignment between the gooseneck coupler 10 and the hitch ball 42 may be substantially corrected. As the gooseneck coupler 10 is lowered onto the hitch ball 42, gravity helps to move the gooseneck coupler 10 into substantial alignment with the hitch ball 42 by riding along the distended surface 80 until the hitch ball 42 enters the opening 74 in the locking plate 20 and the opening 35 (or 35a) in the base plate 16.

The locking mechanism 24 may be attached to the locking plate 20. The locking mechanism 24 may be positioned on the locking plate 20 in such a manner as to allow the inner tube 14 to be substantially un-obstructively retracted into the outer tube 12. This can be seen, for example, in FIG. 2A. More specifically, the locking mechanism 24 may be attached to the locking plate 20 in a location permitting the lower end of outer tube 12 to be in close proximity to the locking plate 20 when the inner tube 14 is in the retracted position. In this manner, the locking mechanism 24 does not interfere with the telescoping engagement of the inner tube 14 with the outer tube 12.

Figure 1A:
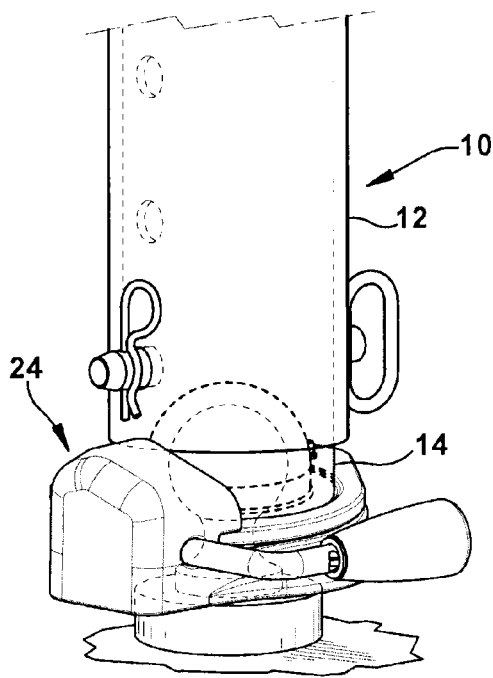
FIG. 1A is a perspective view of a portion the gooseneck coupler of FIG. 1 in a retracted position.
Figure 1B:
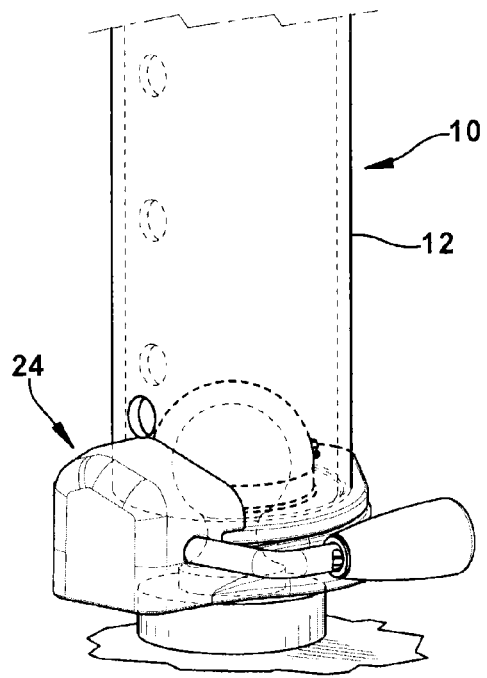
FIG. 1B is a perspective view of a portion of the gooseneck coupler of FIG. 1 in a fully retracted position.

In exemplary embodiments shown in FIGS. 1A and 1B, the inner tube 14 may be capable of retracting into the outer tube 14 until the base plate 16 is adjacent or in contact with the outer tube 12. It these embodiments, the retraction of the inner tube 14 may be limited by the base plate 16, not the locking mechanism as is common in the prior art. In an exemplary embodiment, a portion of the outer tube 12 may extend below at least a portion of the locking mechanism 24 when the inner tube 14 is retracted or fully retracted. In these embodiments, the locking mechanism 24 may not restrict the retraction of the outer tube 12 relative to the inner tube 14. The locking mechanism 24 not restricting retraction of the outer tube 12 may result in the outer tube 12 being in close proximity to, contacting or may rest upon the base plate 16 as shown in FIG. 1B.

The locking mechanism 24 may include a body portion 82 that is attached to the locking plate 20, as shown in FIGS. 3 and 6-9. The body portion 82 may be welded to the locking plate 20 or alternatively, may be integrally formed with the locking plate 20 so that they are formed of one integral piece. The body portion 82 may include at least one aperture 85.

Although, in the exemplary embodiment shown, by way of a non-limiting example, two apertures 85 are shown located on opposite sides of the body portion 82.

The locking mechanism 24 may further include a handle 90. The handle 90 may comprise a substantially straight tubular portion 92 and a curved portion 94. The straight portion 92 and the curved portion 94 may be integrally formed together, may be welded together, or otherwise attached using fasteners, or the like. The straight portion 92 may extend through the body portion 82, and in particular, through the apertures 85 such that at least a portion of the straight portion 92 is retained within the body portion 82. At least one bushing 96 may be retained within the apertures 85 in the body portion 82 to help retain the handle 90 within the body portion 82. In particular, a single bushing 96 may be positioned within either one of the apertures 85, or alternatively, a bushing 96 may be positioned in each of the apertures 85. In an exemplary embodiment, the bushings 96 may be oil impregnated bushings. The oil impregnated bushings 96 may help allow the locking mechanism 24 to remain lubricated during its operation. Specifically, lubrication of the handle 90 may extend the life of the locking mechanism 24 by helping reduce the occurrence of oxidation. Additionally, lubrication of the handle 90 may make rotation of the handle 90 easier during operation.

The locking mechanism 24 may further include a cam 97 and a spring 98. The spring 98 may telescopingly engage the handle 90 within the body portion 82 of the locking plate 20. In particular, the spring 98 telescopingly engages the straight portion 92 of the handle 90. In this exemplary embodiment, the spring 98 works as a dual action spring, particularly working in compression and torsion. For example, the torsion of the spring 98 may help keep the handle 90 and the cam 97 in the locked position under a predetermined preload based upon the torsional compressibility of the spring 98. The compression of the spring 98 may also help keep the spring 98 and bushing 96 in place on the handle 90. The torsion of the spring 98 may help prevent the handle 90 from rattling within the body portion 82.

As shown in the exemplary embodiment of FIG. 4, the cam 97 may be attached to the handle 90 adjacent the spring 98. In particular, the cam 97 may be secured to the straight portion 92 of the handle 90 and may be positioned between the spring 98 and the body portion 82 in close proximity to one of the apertures 85. By way of a non-limiting example, the cam 97 may be secured to the handle 90 such as by using a fastener, such as a pin mechanism. The cam 97 may be cast, forged, or the like. The cam 97 may include a blade 100 that may be attached by welding, integrally forming it with the cam 97, or the like. In a non-limiting example, the blade 100 may be shaped, sized and positioned on the cam 97 to create a substantially helix like structure, which will be described in more detail below. The cam 97 may further include a lubrication fitting 102 at an appropriate position thereon, an example of which is shown in FIG. 7. The lubrication fitting 102 may allow the lubrication of the locking mechanism 24 and in particular certain moveable parts of the locking mechanism 24. For example, the lubrication fitting 102 may allow lubricant to be added to lubricate the rotating engagement of the bushing 96 and the handle 90, and of the cam 97 and handle 90.

The curved handle portion 94 includes a gripping portion 110. The gripping portion 110 may be made of a material such as plastic, rubber, or any such similar material. The gripping portion 110 may be of an ergonomically beneficial shape such that it may make gripping the handle 90 easier. The gripping portion 110 may be attached to the handle 90 as through fasteners, adhesives or the like or may be integrally formed with the handle 90.

In operation, the gooseneck coupler 10 is capable of engaging the hitch ball 42 attached to the towing vehicle such that the towing vehicle may tow the towed vehicle. More specifically, the gooseneck coupler 10 may be positioned over the hitch ball 42 on the towing vehicle. The locking mechanism 24 is put in the unlocked position and the locking plate 20 is lined up with the base plate 16. The hitch ball 42 is then positioned through the hitch ball opening 74 in the locking plate 20 and through the opening 35 (or 35a) in the base plate 16 until the hitch ball 42 rests within the socket 39. Then the locking plate 20 may be pivoted against the hitch ball 42 to wedgingly engage the locking plate 20 with the hitch ball 42. The handle 90 may be used to help pivot the locking plate 20.

The locking mechanism 24 may then be engaged to the locking position to lock the gooseneck coupler 10 to the hitch ball 42. The locking mechanism 24 may be rotated from the unlocked position to the locked position. By way of a non-limiting example, to lock the locking mechanism 24 the handle 90, and in particular, the gripping portion 110, may be rotated counter-clockwise by a user. As the handle 90 is rotated counter-clockwise the blade 100 rotates in a substantially helical path and begins to engage the slot 62 of the base plate 16, which wedgingly engages the locking plate 20 to the hitch ball 42. The more the handle 90 is rotated counter-clockwise the more the blade 100 engages the slot 62 of the base plate 16. More specifically, the blade 100 moves helically toward the slot 62 of the base plate 16. As the blade 100 engages the slot 62 of the base plate, the locking plate 20 may be pivoted relative to the base plate 16 at the pivot 67. The more the locking plate 20 pivots relative to the base plate 16 the more the locking plate 20 engages the hitch ball 42 further securing the gooseneck 10 to the hitch ball 42. The relative rotation between base plate 16 and locking plate 20 causes openings 35, 74 to become misaligned and secures the hitch ball 42 within socket 39. In an alternative embodiment, the hitch ball 42 may be engaged between the locking plate 20 and the clinch 75 as described above. In this alternative embodiment, the locking mechanism 24 may operate substantially as described herein.

The blade 100 further creates a hard stop when it is fully engaged with the slot 62 of the base plate 16. This prevents further rotation of the handle 90 beyond the locked position. More specifically, when the handle 90 is in the fully locked position, the blade 100 will rest on top of the base plate 16, which prevents further rotation of the handle 90. When in the locked position, the handle 90 is in an approximate coplanar position relative to the base plate 16. When handle 90 is in the unlocked position, the handle 90 is in a substantially vertical position relative to the base plate 16 and more specifically is disengaged from the slot 62 of the base plate 16.

The structure of the exemplary embodiment of the locking mechanism 24 permits an operator to use the handle 90 to lock the gooseneck coupler 10. In operation, the operator may only need to use the handle 90 to move the locking plate 20 to pivot relative to the base plate 16 to lock the gooseneck coupler 10 in place.

Additional embodiments of a gooseneck coupler according the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired gooseneck coupler without departing from the spirit and scope of the present teachings.

Figure 22:
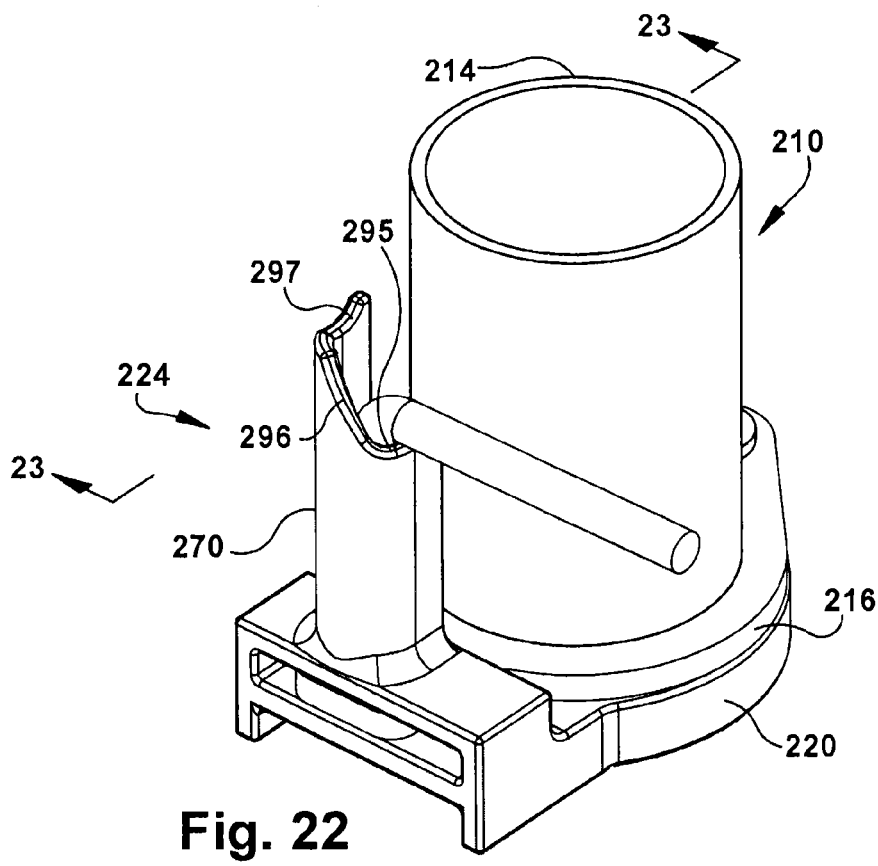
FIG. 22 is a perspective view of a portion of other embodiments of a gooseneck coupler.
Figure 23:
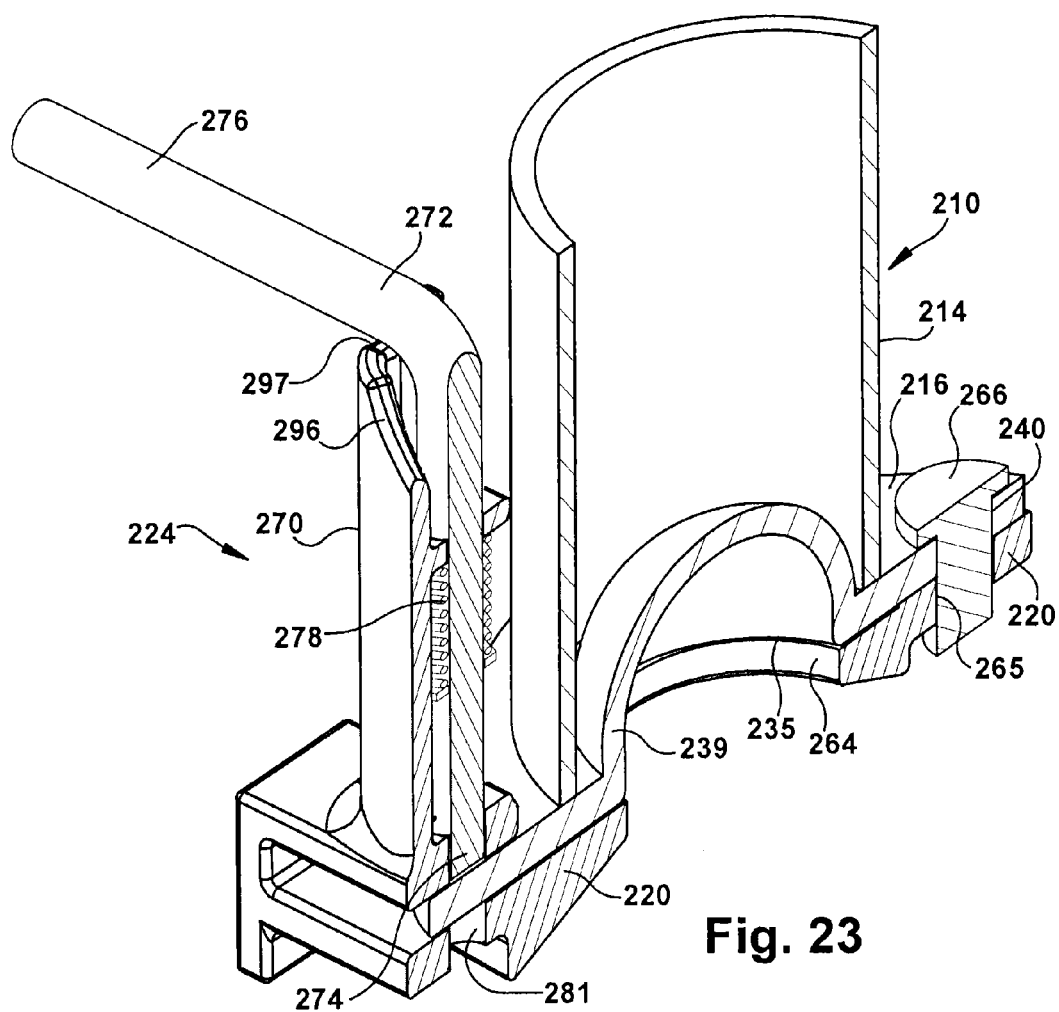
FIG. 23 is a cross-sectional perspective view of the embodiments of the gooseneck coupler along line 23-23 of FIG. 22 in an unlocked position.

In another embodiment, such as that shown in FIGS. 22 and 23, a gooseneck coupler 210 may include an inner tube 214, an outer tube (not shown), a base plate 216, a locking plate 220, and a locking mechanism 224. The base plate 216 may include an opening 235 and a socket 239. The base plate 216 may include a first aperture (not shown) and a second aperture 240. The locking plate 220 may include a hitch ball opening 264 that may be selectively aligned with the hitch ball opening 235 of the base plate 216. The locking plate 220 may include a first aperture 281 and a second aperture 265. The gooseneck coupler 210 may also include a fastener 266 which may be sized and shaped to engage the second aperture 265 of the locking plate 220 and the second aperture 240 of the base plate 216, respectively, to pivotally secure the base plate 216 and locking plate 220 together. The fastener 266 may be of any appropriate shape, size, type or configuration that may provide for a pivotal relationship between the base plate 216 and the locking plate 220.

The locking mechanism 224 may be attached to the locking plate 220. More specifically, the locking mechanism 224 may include a tubular portion 270 that is attached to the locking plate 220 such as by welding or integrally forming it therewith. The locking mechanism 224 may further include a handle 272 inserted through the tubular portion 270. The handle 272 may comprise an engaging portion 274 and a grasping portion 276. The engaging portion 274 and grasping portion 276 may be attached by welding them together, forming them integrally with one another, attaching them using a fastening device, or the like. The handle 272 may be moved axially relative to tubular portion 270 to lock and unlock gooseneck coupler 210. The engaging portion 274 extends within the tubular portion 270 and may be shaped and sized to engage corresponding apertures in the base plate 216 and the locking plate 220. In particular, the base plate 216 may include an aperture or opening in lieu of slot 62 that is configured to receive engaging portion 274 and allow the engaging portion 274 to extend therethrough and into corresponding aperture 281 in locking plate 220 to thereby allow engaging portion 274 to pivotally lock the locking plate 220 relative to the base plate 216. When the handle 272 is in this position, the gooseneck coupler 210 is in the locked position. In some embodiments, engaging portion 274 may extend only into the aperture in the base plate 216, and not into an aperture 281 in the locking plate 220, to pivotally lock the locking plate 220 relative to the base plate.

The locking mechanism 224 may further include a compression spring 278. The compression spring 278 may be telescopingly engaged with the engaging portion 274 of the handle 272 within the tubular portion 270. The spring 278 may bias the handle 272 to the locked position (toward locking plate 220) such that the engaging portion 274 engages the aperture in the base plate 216 and the aperture 281 in the locking plate 220 and handle 272 is resting in recess 295 of tubular portion 270. In operation, the locking mechanism 224 can be moved axially and rotated along a camming surface 296 to unlock the locking mechanism 224. More specifically, the handle 272 may be rotated approximately 180° to unlock the engaging portion 274 and handle 272 can be held in the unlocked position by resting in recess 297 of tubular portion 270. When in the unlocked position, locking plate 220 can pivot or slide relative to the base plate 216 to open the gooseneck coupler 210. To close the gooseneck coupler 210, locking plate 220 may be pivoted or slid relative to the base plate 216 and the handle 272 may be rotated counter-clockwise approximately 180° to the locked position and rest in recess 295.

Figure 24:
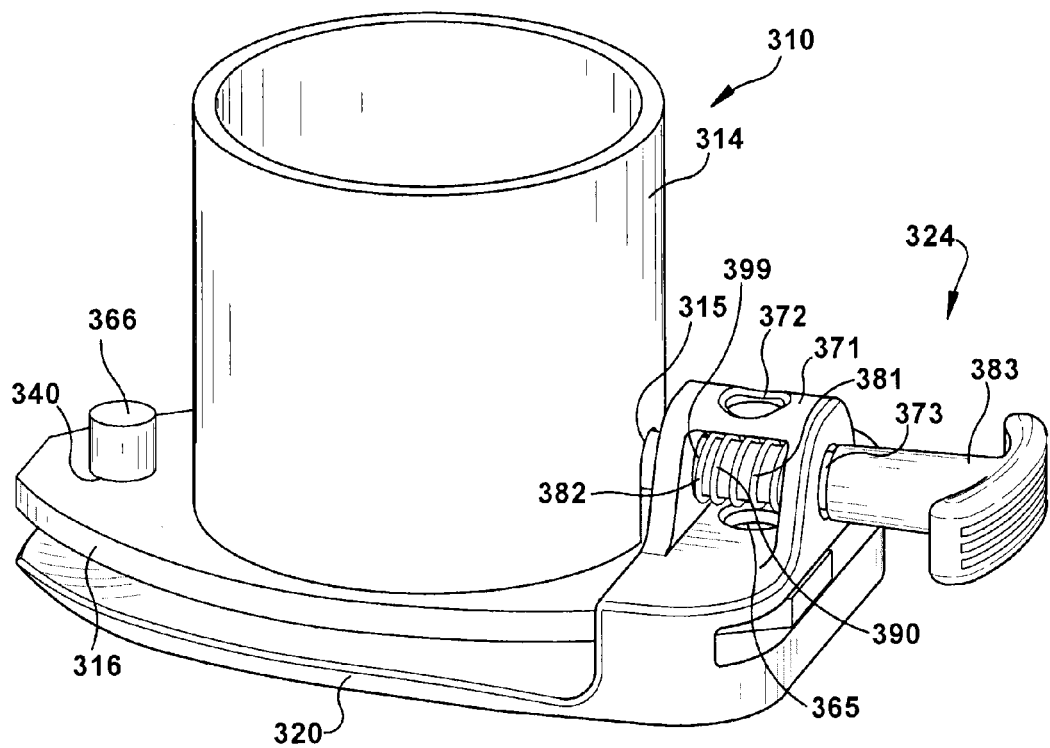
FIG. 24 is a perspective view of a portion of other embodiments of a gooseneck coupler.

In the embodiment shown in FIG. 24, a gooseneck coupler 310 includes an outer tube (not shown), an inner tube 314 having an optional aperture 315, a base plate 316, a locking plate 320, and a locking mechanism 324. In this embodiment, the base plate 316 may be pivotally coupled to locking plate 320 to allow selective alignment between corresponding hitch ball openings and the socket. A fastener 366 or the like may be used to pivotally couple the base plate 316 to the locking plate 320. Fastener 366 may be sized and shaped to engage the aperture 340 of the base plate 316 and a corresponding aperture (not shown) of the locking plate 320. The fastener 366 may be of any appropriate shape, size, type or configuration that may provide for a pivotal relationship between the base plate 316 and the locking plate 320.

The locking mechanism 324 may be attached to the locking plate 320. More specifically, the locking mechanism 324 includes a body 371 attached to the locking plate 320 via welding, integrally forming the two together or the like. The body 371 may include two different sets of apertures to allow two different configurations for locking mechanism 324. The two sets of apertures may both be present or just one set of apertures may be present as desired. The first set of apertures may include a first aperture 372 on the top side thereof, which substantially aligns with an aperture 365. The second set of apertures may include aligned apertures 373, 399 on opposing side portions of the body 371. The locking mechanism 324 may further include an axially movable pin 381. The pin 381 may include an engaging portion 382 and a gripping portion 383. The locking mechanism 324 may further include a compression spring 390 telescopingly engaged with the pin 381 within the body 371, which may bias pin 381 in a locked/locking position. When pin 381 is used with apertures 373, 399, inner tube 314 may include optional aperture 315.

In operation, the pin 381 may be disposed in either the first (372, 365) or second (373, 399) set of apertures. When the pin 381 is disposed in the first set of apertures 372, 365 the engaging portion 382 will extend through apertures 372, 365 and into a corresponding aperture (not shown) in the base plate 316 to pivotally lock the base plate 316 to the locking plate 320 thereby maintaining the gooseneck coupler 310 in the locked position. Spring 390 may be biased to keep the engaging portion 382 of the pin 371 within the apertures of the base plate 316 and locking plate 320. To open or unlock gooseneck coupler 310, pin 381 may be pulled away from base plate 316 to thereby disengage and allow relative pivotal movement between base plate 316 and locking plate 320.

Alternatively, when the pin 381 is disposed in the second set of apertures 373, 399, the engaging portion 382 extends through the aperture 399 in the body 371 and into the aperture 315 in the inner tube 314. The engagement of pin 381 with aperture 315 pivotally locks base plate 316 relative to the locking plate 320 thereby maintaining the gooseneck coupler 310 in the locked position. Spring 390 may bias the pin 381 to remain in the locked position. To open or unlock gooseneck coupler 310, the gripping portion 383 may be pulled away from the inner tube 314 against the bias of the spring 390 to thereby disengage and allow relative pivotal movement between base plate 316 and locking plate 320.

Figure 25:
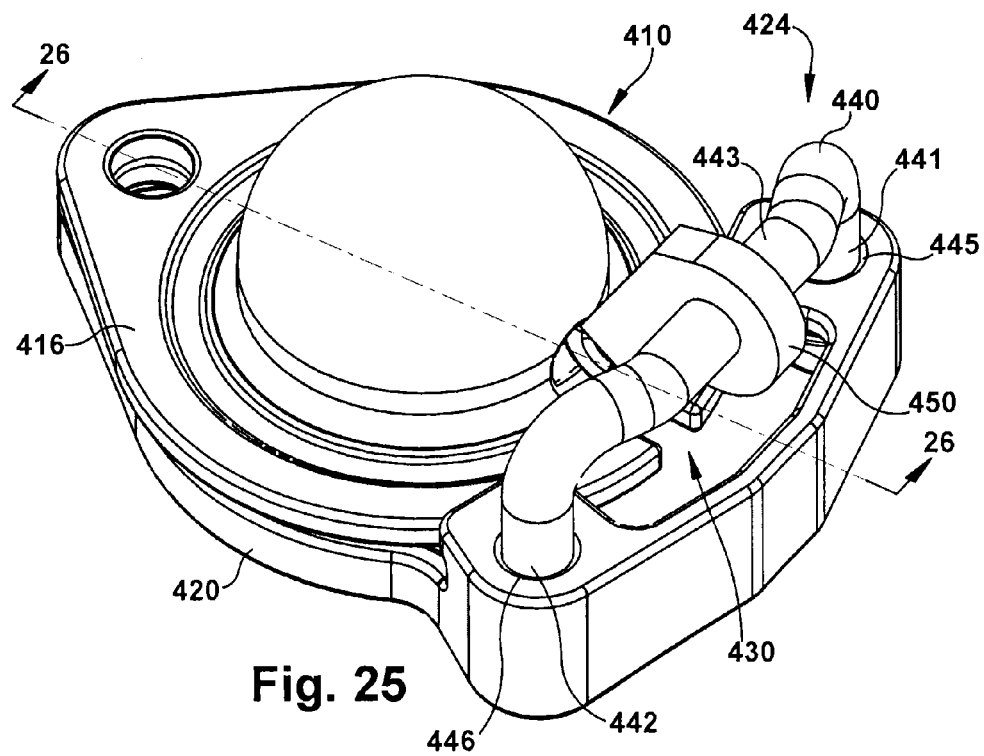
FIG. 25 is a perspective view of a portion of still other embodiments of a gooseneck coupler.
Figure 26:
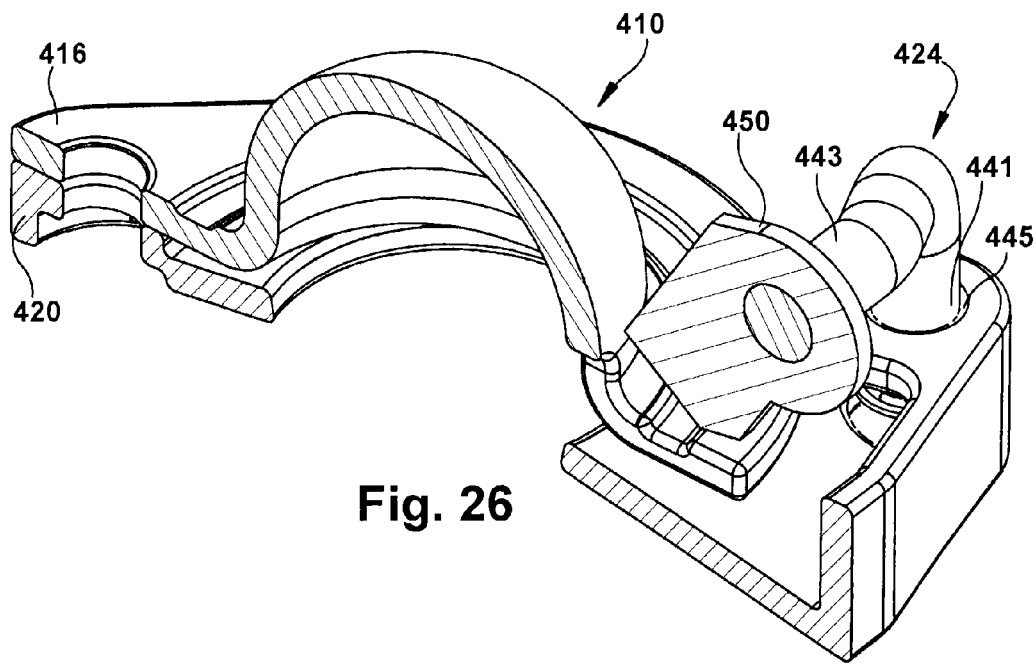
FIG. 26 is a cross-sectional perspective view of the embodiments of the gooseneck coupler along line 26-26 of FIG. 25.

In the embodiment shown in FIGS. 25 and 26, a gooseneck coupler 410 may include an outer tube (not shown), an inner tube (not shown), a base plate 416, a locking plate 420 pivotally coupled to base plate 416, and a locking mechanism 424. The base plate 416 may include a slot 430. The locking mechanism 424 may include a movable handle 440 to selectively unlock base plate 416 from locking plate 420. The handle 440 may include a first end 441 and a second end 442. The first and second ends 441, 442 may be movably attached to the locking plate 420 and extend through first and second apertures 445, 446, respectively, in the locking plate 420. Springs (not shown) may be telescopingly engaged with the first and second ends 441, 442 of the handle 440 within the apertures 445, 446 of the locking plate 420. The springs may bias the handle 440 toward a locked position (toward locking plate 420 in the orientation shown).

The handle 440 may further include a gripping portion 443. The gripping portion 443 may have attached thereto a locking tab 450. The tab 450 may be shaped and sized to engage the slot 430 of the base plate 416 when in the locked position. To move the gooseneck coupler 410 to the unlocked position, one may pull upward (in the orientation shown) on the handle 440 to overcome the biasing force of the springs thereby disengaging the tab 450 from the slot 430. In this position, relative pivotal movement between the base plate 416 and locking plate 420 may be permitted.

Figure 27:
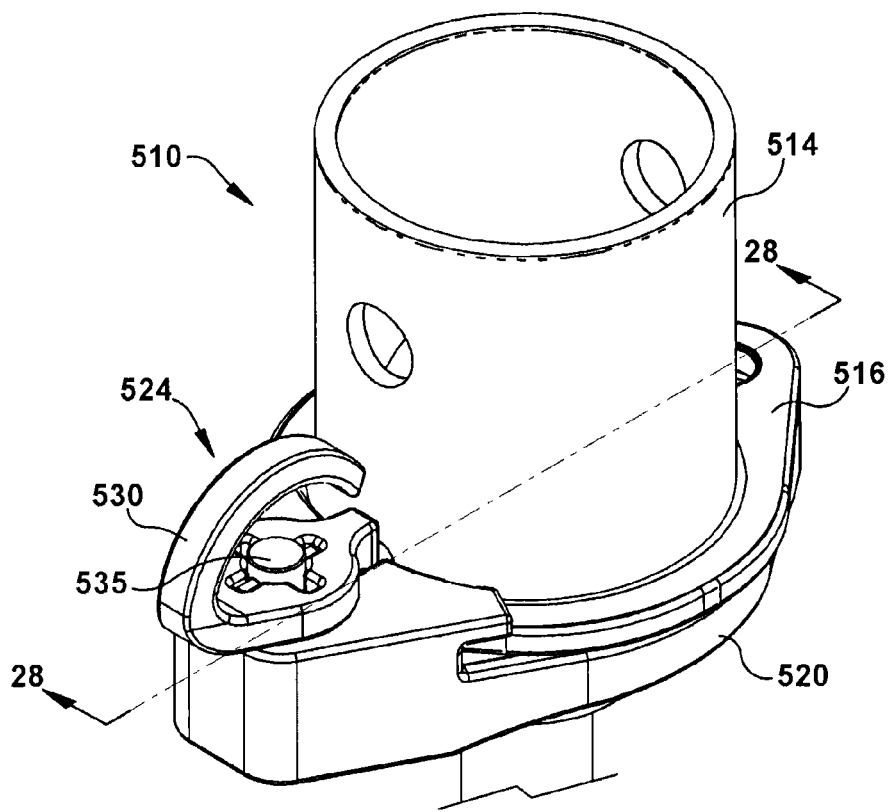
FIG. 27 is a perspective view a portion of other embodiments of a gooseneck coupler.
Figure 28:
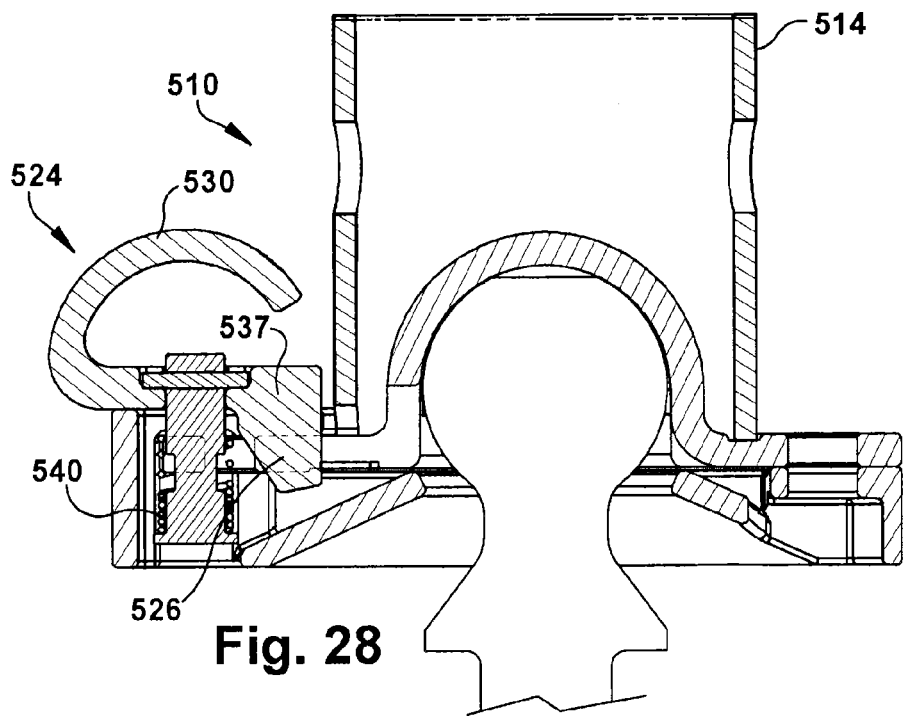
FIG. 28 is a cross-sectional view of the gooseneck coupler along line 28-28 of FIG. 27.

In the embodiment shown in FIGS. 27 and 28 the gooseneck coupler 510 may include an outer tube (not shown), an inner tube 514, a base plate 516 attached with the inner tube 514, and a locking plate 520 pivotally connected with the base plate 516. The base plate 516 may include slot 526. The gooseneck coupler 510 may further include a locking mechanism 524 attached to the locking plate 520.

The locking mechanism 524 may comprise an axially and rotatably moveable handle 530 attached to the locking plate 520 via a fastener 535. The handle 530 in this embodiment may be substantially shaped as a half-circle as shown. A spring 540 may be positioned between the handle 530 and the locking plate 520 such that the spring 540 biases the handle 530 toward the locking plate 520 (the locking position). The locking mechanism 524 may further include a tang 537 attached to the handle 530. The tang 537 may be welded to the handle 530, integrally formed with the handle 530 or the like. In some embodiments, such as that shown in FIGS. 29 and 30 a second tang 537*a* may be attached to an opposite side of the handle 530. In some embodiments, such as that shown in FIG. 29, both tangs 537 and 537*a* may include a wedge portion 539 that may help move the locking mechanism 524 from a locked position to an unlocked position as well as act as an aid for entry of the tang 537*a* into slot 526.

When the gooseneck coupler 510 is in the locked position, either one of the tangs 537 or 537*a* may engage the slot 526 of the base plate 516 to thereby pivotally lock the base plate 516 relative to the locking plate 520. To unlock the gooseneck coupler 510, the handle 530 may be lifted against the bias of the spring 540 and rotated until the appropriate tang 537, 537*a* disengages from the slot 526 of the base plate 516. The wedge portion 539 may help with disengaging the tang 537, 537*a* from the slot 526. Additionally, by using two tangs 537 and 537*a*, if one tang 537 or 537*a* wears out from use, the other tang 537 or 537*a* may be used. This may further extend the life of the locking mechanism 524.

Figure 29:
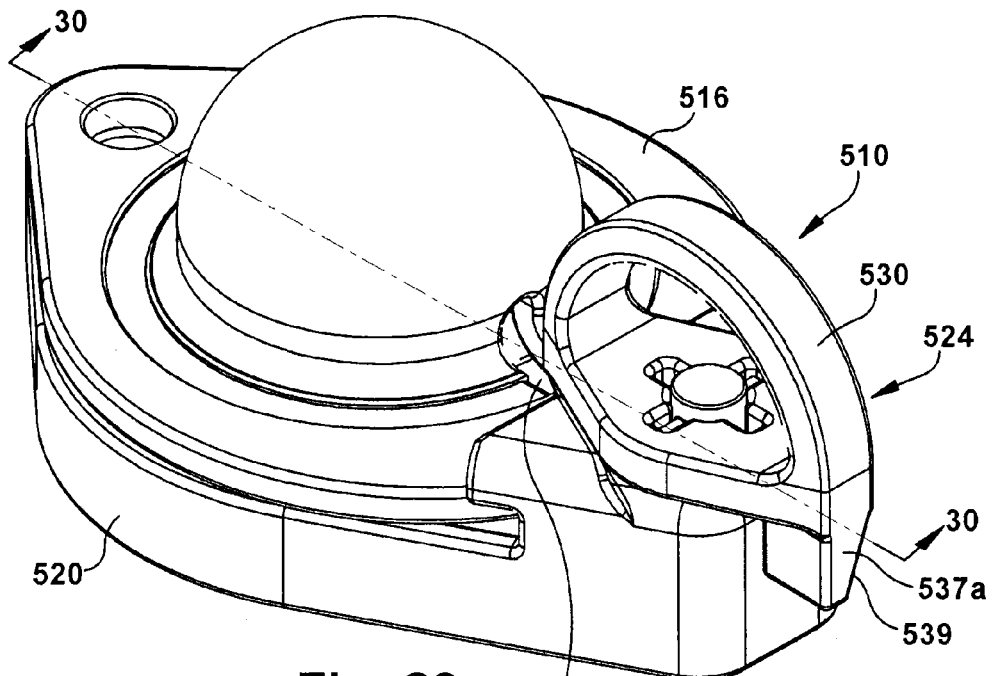
FIG. 29 is a perspective view of a portion of still other embodiments of a gooseneck coupler.
Figure 30:
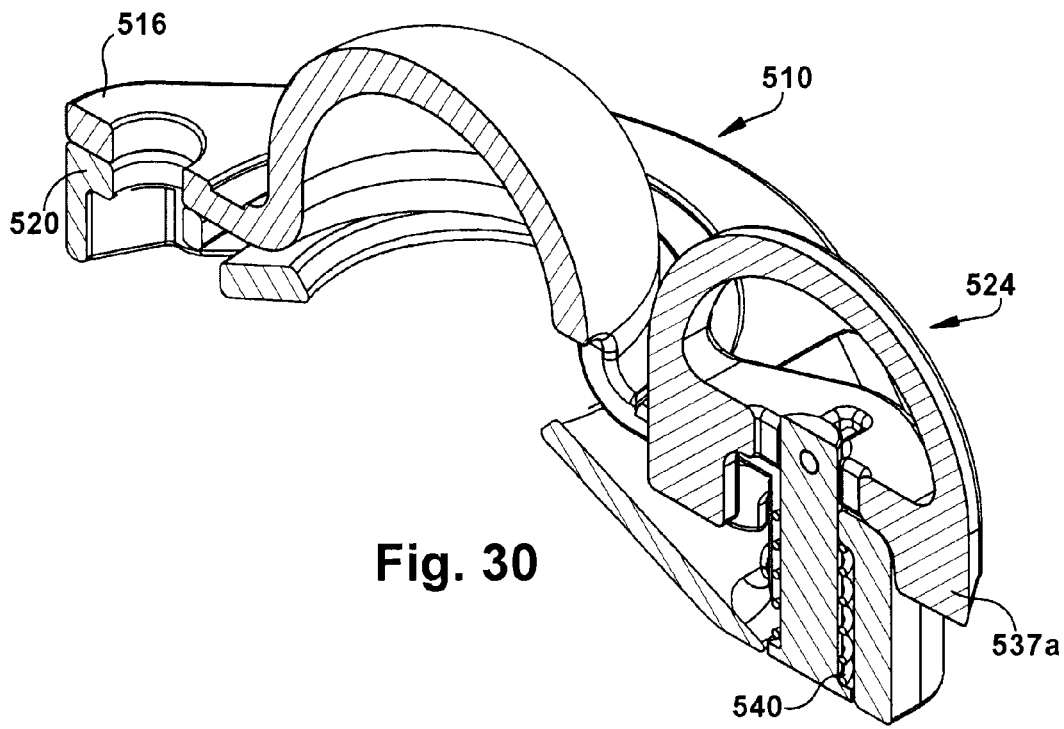
FIG. 30 is a cross-sectional perspective view of the gooseneck coupler along line 30-30 of FIG. 29.
Figure 31:
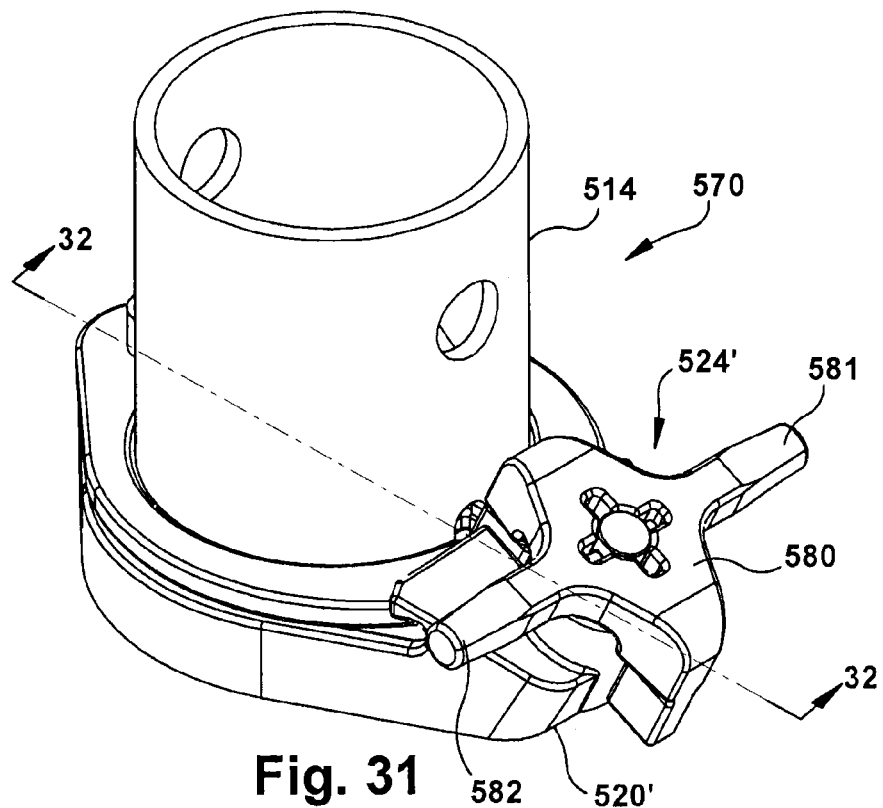
FIG. 31 is a perspective view of a portion of yet other embodiments of a gooseneck coupler.
Figure 32:
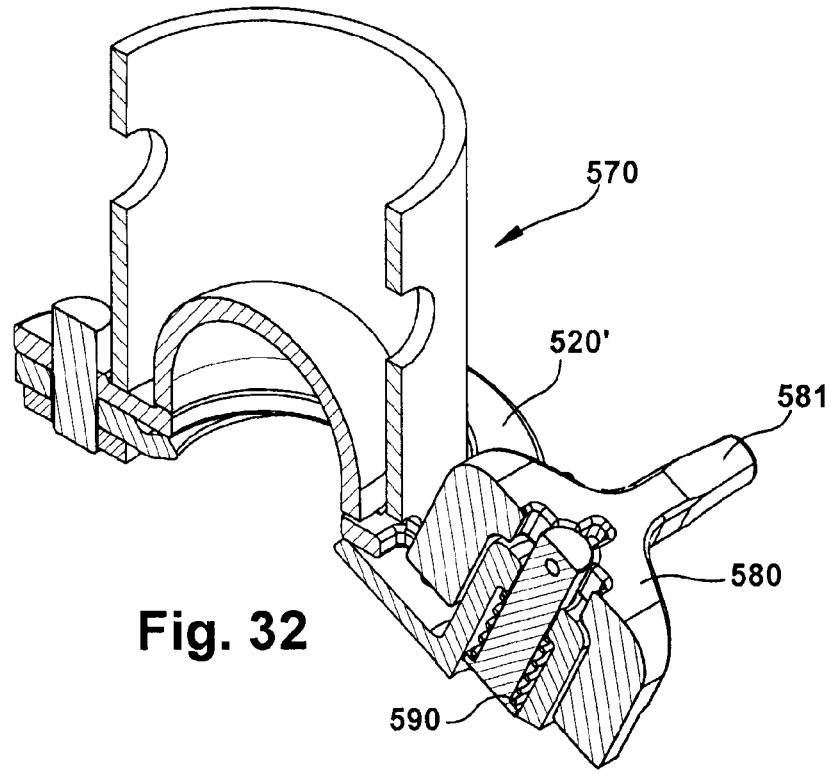
FIG. 32 is a cross-sectional perspective view of the gooseneck coupler along line 32-32 of FIG. 31.

In some embodiments, such as that shown in FIGS. 31 and 32, a gooseneck coupler 570 is similar to that shown in FIGS. 29 and 30 and described above. In this embodiment, the locking mechanism 524' may be attached to the locking plate 520' at a substantially 45° angle. Moreover, the handle 580 may be substantially cross-shaped instead of a half-circle shape. More specifically, the handle 580 may include first and second gripping portions 581 and 582, respectively, laterally spaced from one another. The locking mechanism 524 further may include a spring 590 biasly engaging the handle 580 to remain in the locked position. The remaining parts of the gooseneck coupler 570 may be substantially similar to that described above for gooseneck coupler 510.

Figure 33:
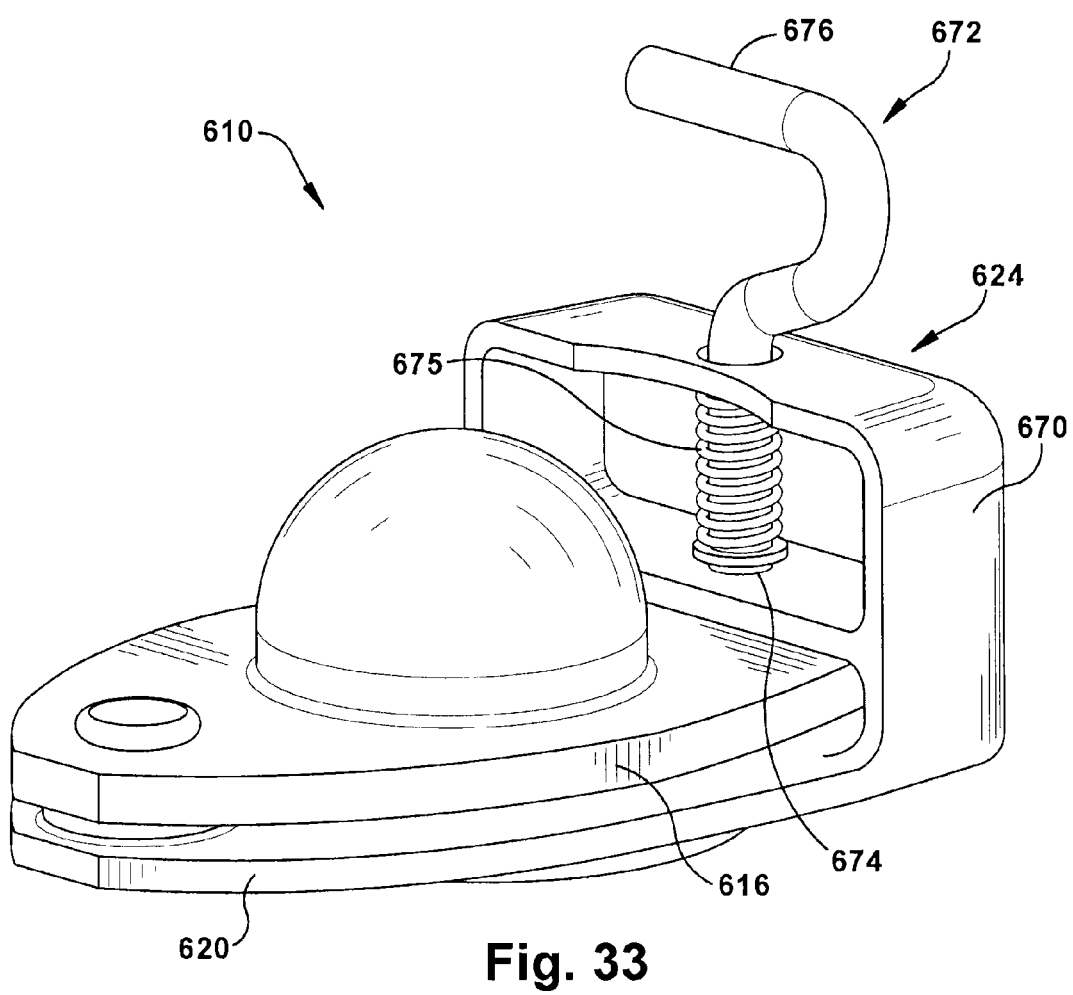
FIG. 33 is a perspective view of a portion of other embodiments of a gooseneck coupler.

In the embodiment shown in FIG. 33, a gooseneck coupler 610 may include an outer tube (not shown) an inner tube (not shown), a base plate 616 attached with the inner tube, and a locking plate 620 pivotally connected with the base plate 616. The gooseneck coupler 610 may further include a locking mechanism 624. In this embodiment, the base plate 616 and locking plate 620 may include selectively alignable apertures (not shown) that can be used to pivotally lock the base plate 616 relative to the locking plate 620. The locking mechanism 624 may be attached to the locking plate 620. More specifically, the locking mechanism 624 may include a body portion 670 that is attached to the locking plate 620 such as by welding, integrally forming it therewith, or the like. The locking mechanism 624 may further include a handle 672 inserted through the body portion 670. The handle 672 may comprise an engaging portion 674 and a grasping portion 676. The engaging portion 674 and grasping portion 676 may be attached by welding them together, forming them integrally with one another, attaching them using a fastening device, or the like. The engaging portion 674 may extend through the body portion 670 and be shaped and sized to engage the selectively alignable apertures (not shown) in the locking plate 620 and base plate 616. When the handle 672 is engaged with the apertures (not shown) in base plate 616 and locking plate 620 the gooseneck coupler 610 is in the locked position.

The locking mechanism 624 may further include a compression spring 675. The compression spring 675 may be telescopingly engaged with the engaging portion 674 of the handle 672 within the body portion 670. The spring 675 may bias the handle 672 to the locked position such that the engaging portion 674 engages the apertures (not shown) in the locking plate 620 and base plate 616. In operation, the locking mechanism 624 may be lifted to unlock the locking mechanism 624 and allow relative pivotal movement between locking plate 620 and base plate 616.

Figure 34:
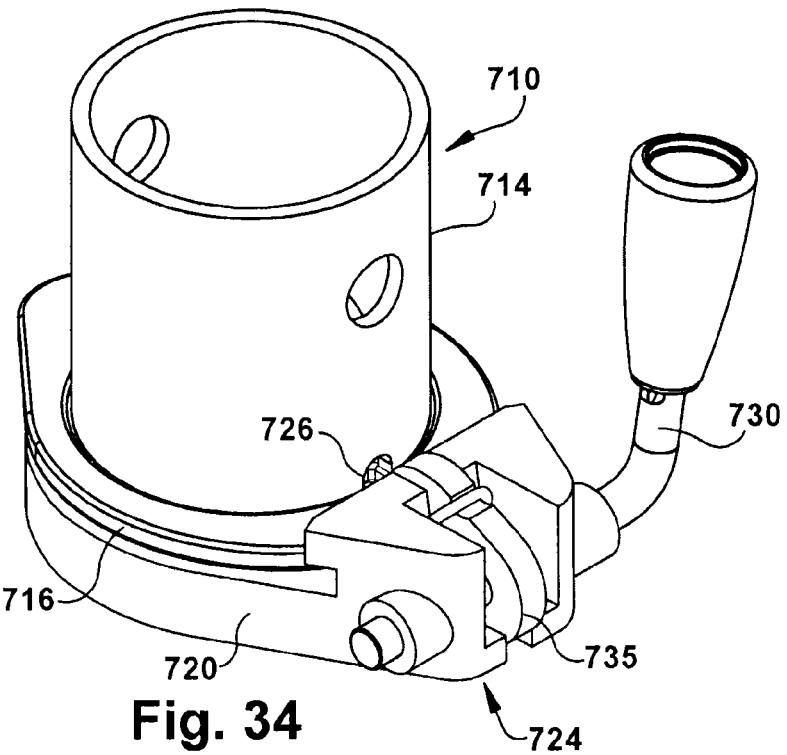
FIG. 34 is a perspective view of a portion of still other embodiments of a gooseneck coupler.

In the embodiment shown in FIG. 34, a gooseneck coupler 710 may include an outer tube (not shown), an inner tube 714, a base plate 716 attached with the inner tube 714, and a locking plate 720 pivotally connected with the base plate 716. The base plate 716 in addition to or alternatively the inner tube 714 may include a slot 726. The gooseneck coupler 710 further may include a locking mechanism 724 attached to the locking plate 720.

The locking mechanism 724 may include a rotatable handle 730 attached to the locking plate 720. The locking mechanism 724 may include a blade 735 that is capable of engaging the slot 726 when in the locked position to prevent relative pivotal movement between base plate 716 and locking plate 720. To unlock the locking mechanism 724, the handle 730 may be rotated until the blade 735 disengages from the slot 726 such that the locking plate 720 may pivot relative to the base plate 716.

Figure 35:
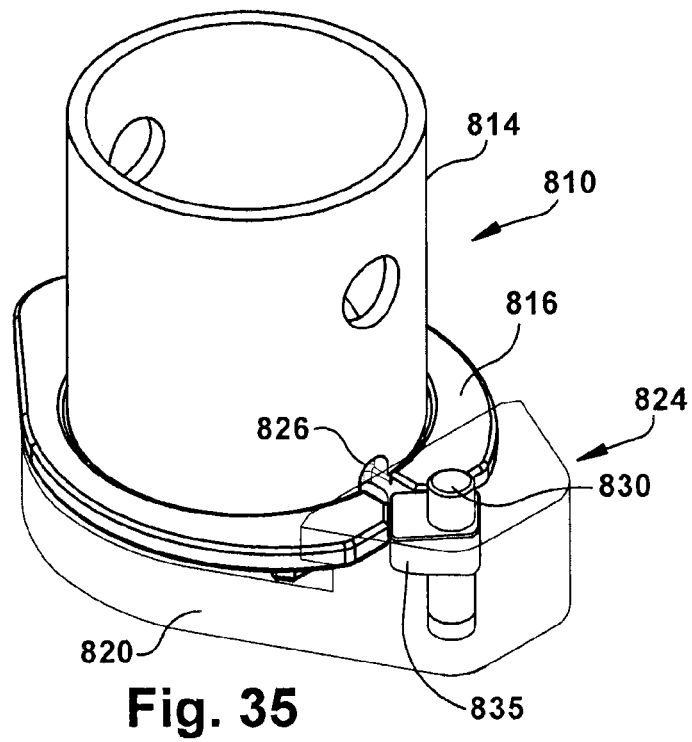
FIG. 35 is a perspective view of a portion of yet other embodiments of a gooseneck coupler.

In the embodiment shown in FIG. 35, a gooseneck coupler 810 may include an outer tube (not shown), an inner tube 814, a base plate 816 attached with the inner tube 814, and a locking plate 820 pivotally connected with the base plate 816. The base plate 816 in addition to or alternatively the inner tube 814 may include corresponding slot 826. The gooseneck coupler 810 further includes a locking mechanism 824 attached to the locking plate 820.

The locking mechanism 824 may include a push button 830 attached to the locking plate 820. The locking mechanism 824 may include a boss 835 that is capable of engaging the slot 826 when in the locked position. Boss 835 may be of any appropriate size, shape or configuration, such as substantially square. When boss 835 is engaged with slot 826, base plate 816 is pivotally locked relative to locking plate 820. Further a spring (not shown) may bias the boss 825 into engagement with the slot 826 to help keep the gooseneck coupler 810 in the locked position. To unlock the locking mechanism 824, the push button 830 may be pushed downward (toward locking plate 820) until the stamping boss 825 disengages from the slot 826 such that the locking plate 820 may pivot relative to the base plate 816.

Figure 36:
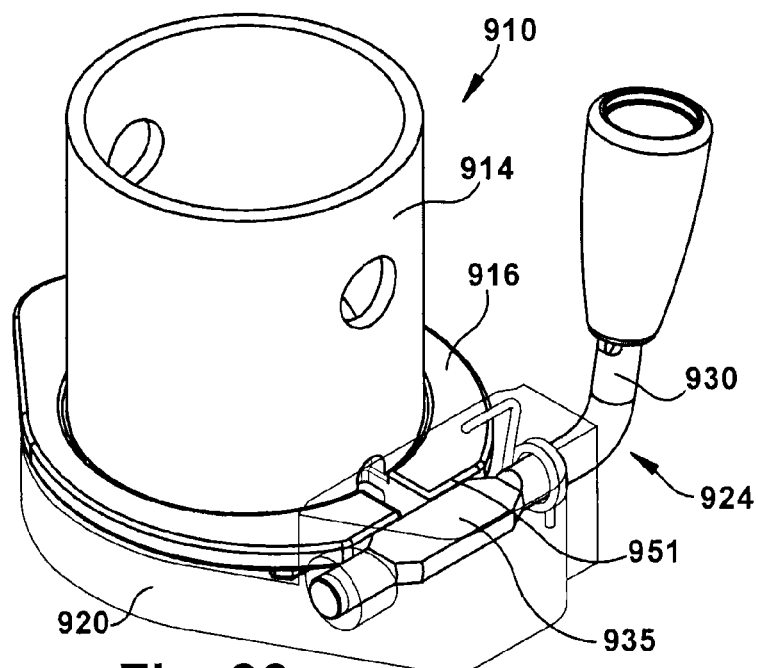
FIG. 36 is a perspective view of a portion of other embodiments of a gooseneck coupler.

In the embodiment shown in FIG. 36, a gooseneck coupler 910 may include an outer tube (not shown), an inner tube 914, a base plate 916 attached with the inner tube 914, and a locking plate 920 pivotally connected with the base plate 916. The gooseneck coupler 910 may further include a locking mechanism 924 attached to the locking plate 920.

The locking mechanism 924 may include a rotating handle 930 attached to the locking plate 920. The handle 924 may include a substantially flat portion 935 that is capable of wedgingly engaging a corresponding flat edge portion 951 of the base plate 916 when in the locked position to thereby pivotally lock the base plate 916 relative to the locking plate 920. To unlock the locking mechanism 924, the handle 930 may be rotated until the substantially flat portion 935 disengages from the edge portion 951 of the base plate 916 such that the locking plate 920 may pivot relative to the base plate 916.

Figure 37:
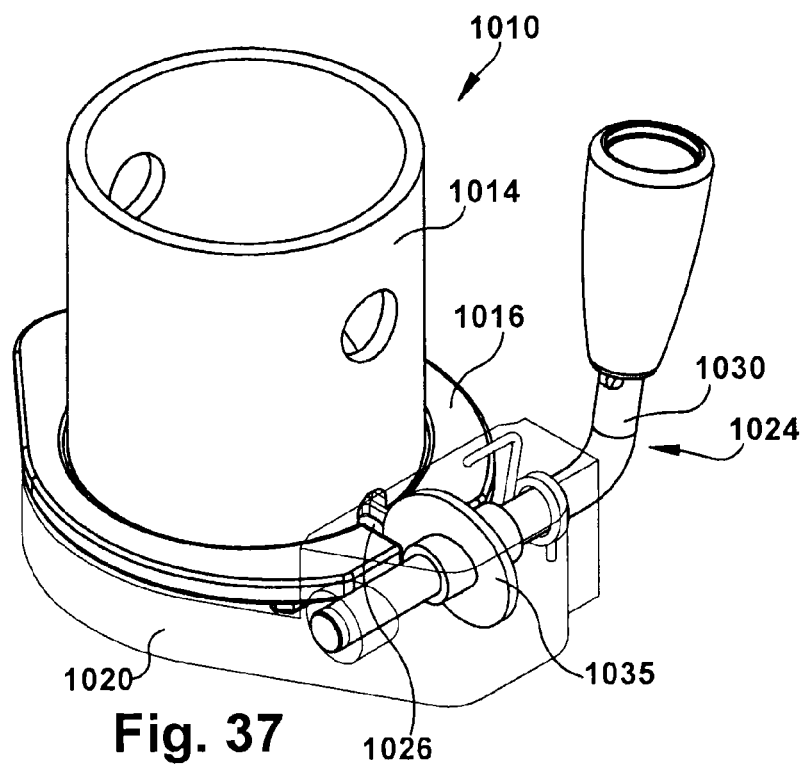
FIG. 37 is a perspective view of a portion of still other embodiments of a gooseneck coupler.

In the embodiment shown in FIG. 37, a gooseneck coupler 1010 may include an outer tube (not shown), an inner tube 1014, a base plate 1016 attached with the inner tube 1014, and a locking plate 1020 pivotally connected with the base plate 1016. The base plate 1016 in addition to or alternatively the inner tube 1014 may include slot 1026. The gooseneck coupler 1010 may further include a locking mechanism 1024 attached to the locking plate 1020.

The locking mechanism 1024 may include a rotating handle 1030 attached to the locking plate 1020. The handle 1024 may include a camming device 1035 that is capable of engaging the slot 1026 to pivotally lock base plate 1016 relative to locking plate 1020 when in the locked position. Camming device 1035 may be any appropriate size, shape or configuration, such as a substantially helical shape. To unlock the locking mechanism 1024, the handle may be rotated until the camming device 1035 disengages from the slot 1026 such that the locking plate 1020 may pivot relative to the base plate 1016. Moreover, when camming device 1035 is helically shaped, the further that the helical shaped camming device 1035 is rotated toward the locked position, the more that the locking plate 1020 engages the hitch ball 42 of the towing vehicle.

In the embodiments shown in FIGS. 38-41 the gooseneck coupler 1110 may include an outer tube 1112, an inner tube 1114, and a base member 1116, which may be a generally hollow plate as shown in FIGS. 38-41. More specifically, the base member 1116 may include a cavity 1117 there within. The cavity 1117 may be of any appropriate shape and size and is not limited to that shown and described. The base member 1116 may include a slot 1121, wherein the slot 1121 may extend from the cavity 1117 as further described below. The base member 1116 may be attached with the inner tube 1114 in any appropriate manner.

Figure 38:
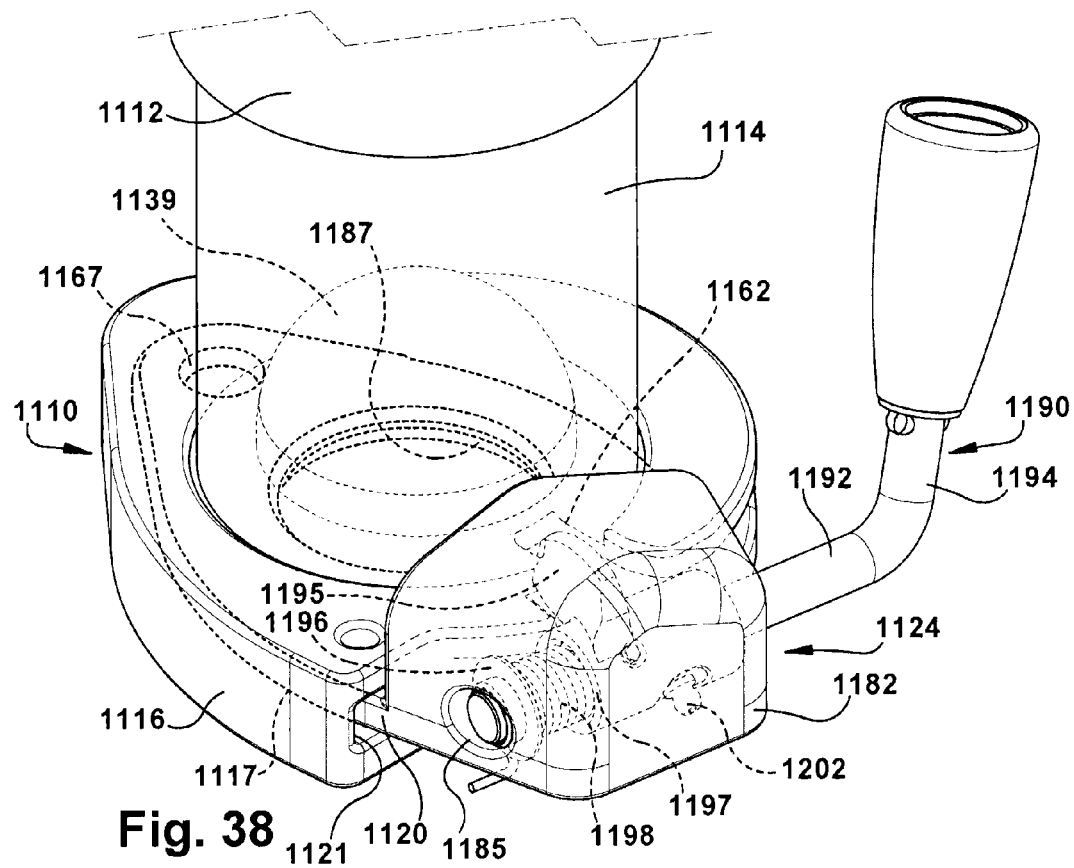
FIG. 38 is a perspective view of a portion of other embodiments of a gooseneck coupler.
Figure 39:
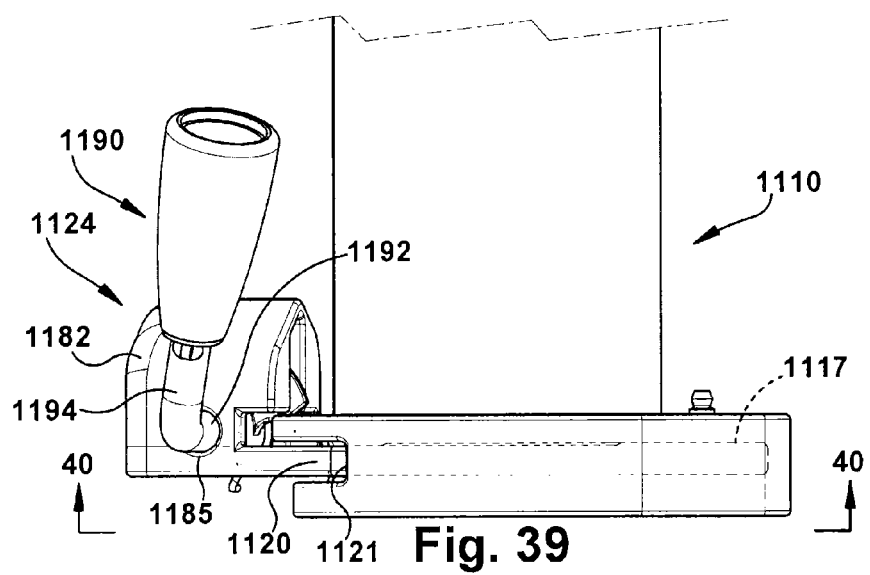
FIG. 39 is a side view of the portion of the other embodiments of the gooseneck coupler of FIG. 38.
Figure 40:
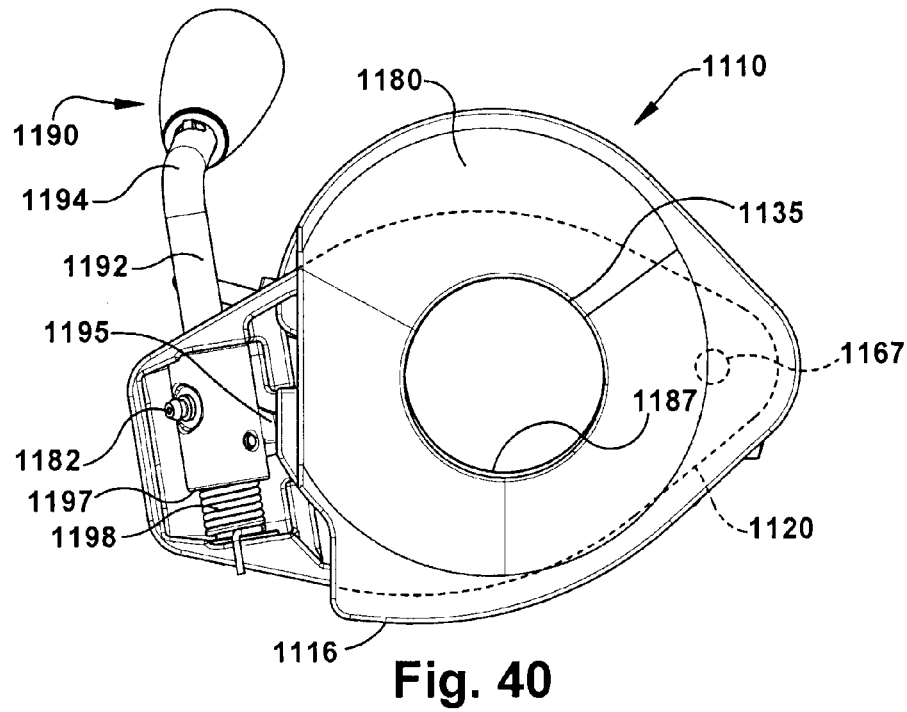
FIG. 40 is a cross-sectional view of the gooseneck coupler along line 40-40 of FIG. 38 in an unlocked position.
Figure 41:
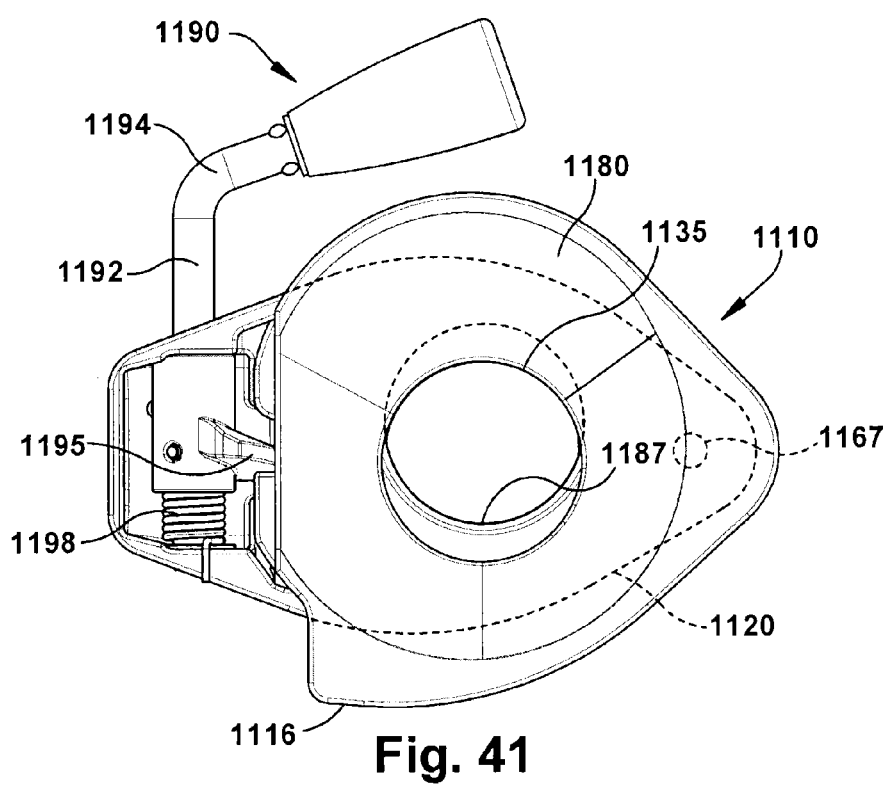
FIG. 41 is a cross-sectional view of the gooseneck coupler along line 40-40 of FIG. 38 in a locked position.
Figure 40A:
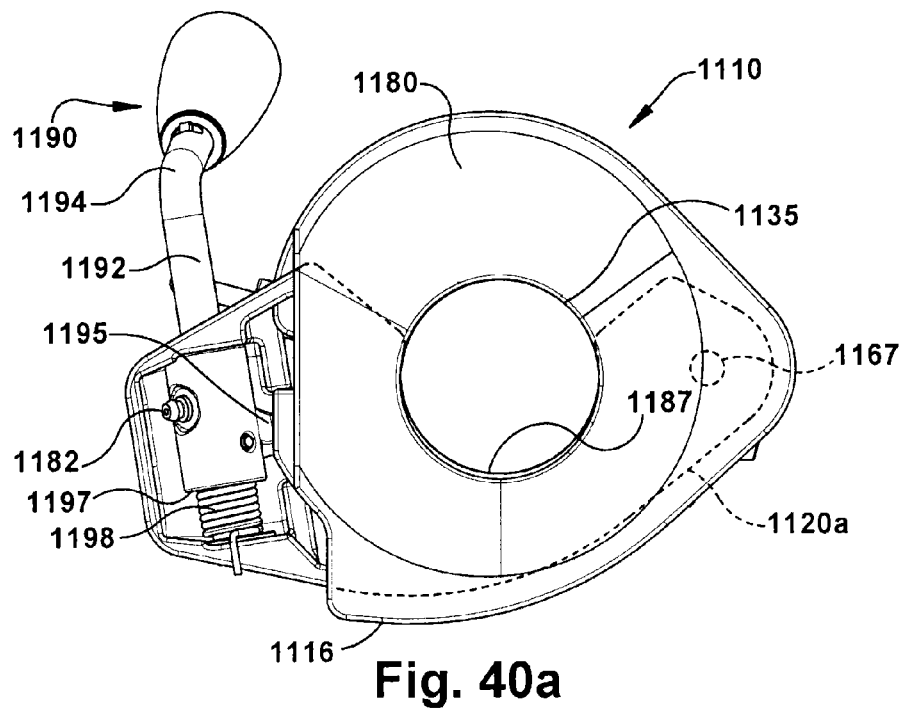
FIG. 40a is a cross-sectional view of other embodiments of a gooseneck coupler in an unlocked position.
Figure 41A:
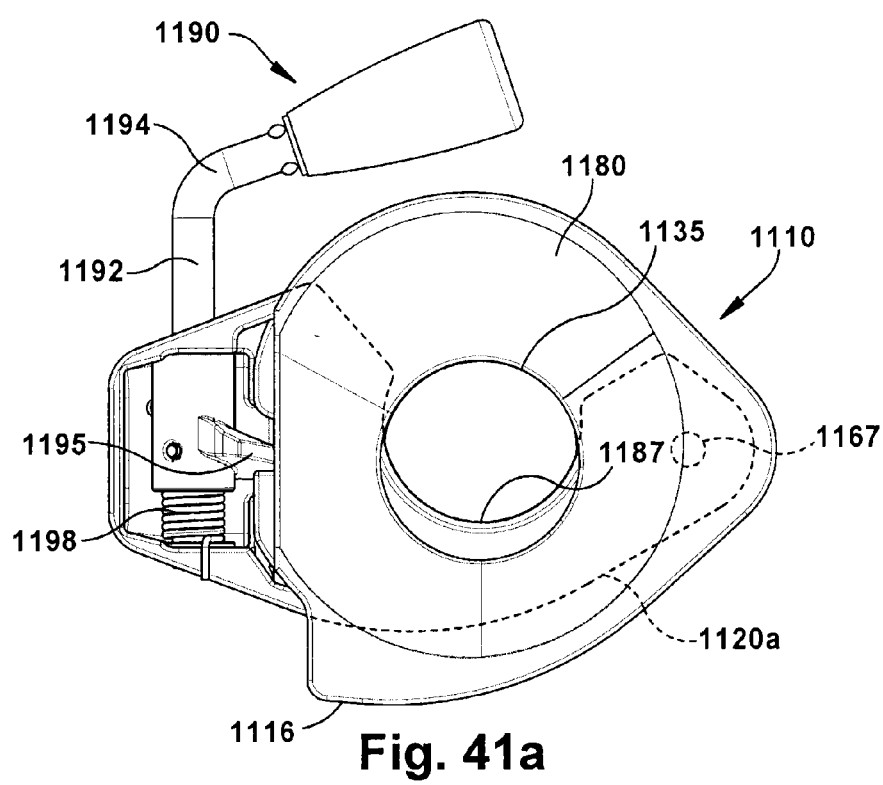
FIG. 41A is a cross-sectional view of gooseneck coupler of FIG. 40a in a locked position.

The gooseneck coupler 1110 may include a locking member 1120 of any appropriate shape and size. In some embodiments, the locking member 1120 may comprise a blade 1120a as shown in FIGS. 40a and 41a or plate 1120 as shown in FIGS. 40 and 41, which may be positioned within the cavity 1117 and may be pivotally attached to the base member 1116 at pivot 1167. At least of portion of the locking member 1120 may be positioned within the cavity 1117 of the base member 1116 and in some embodiments a majority of the locking member 1120 may be positioned within the base member 1116. Further, a portion of the locking member 1120 may extend through the slot 1121 of the base member 1116, as shown in FIGS. 38 and 39. In some embodiments as shown in FIGS. 40a and 41a, the locking member 1120 may be a blade 1120a that includes a recessed portion 1187a that may be shaped and sized to allow the hitch ball 42 to pass through the opening 1135 and the recessed portion 1187a into a cavity 1139 when the gooseneck coupler 1110 is in the unlocked position. In other embodiments as shown in FIGS. 40 and 41, the locking member 1120 may be a plate that includes an aperture 1187 that may be shaped and sized to allow the hitch ball 42 to pass through the opening 1135 and the aperture 1187 into the cavity 1139 when the gooseneck coupler 1110 is in the unlocked position.

The gooseneck coupler 1110 may further include a locking mechanism 1124 that may be attached to the locking member 1120 or 1120a in any appropriate manner. The locking mechanism 1124 may be attached to the locking member 1120 or 1120a in such a manner as to allow the inner tube 1114 to be substantially un-obstructively retracted into the outer tube 1112. More specifically, the locking mechanism 1124 may be attached to the locking member 1120 or 1120a in a location such that the locking mechanism 1124 may generally not interfere with the telescoping engagement of the inner tube 1114 with the outer tube 1112. By way of a non-limiting example, the locking member 1120 or 1120a may be generally positioned within the cavity 1117 and a portion of which may extend from the slot 1121 of the base member 1116. The portion of the locking member 1120 or 1120a that may extend from the slot 1121 may be operatively attached to the locking mechanism 1124 in a position that may generally not interfere or restrict the telescoping engagement of the inner and outer tubes 1114, 1112.

In some embodiments, the base member 1116 may include a slot 1162. The slot 1162 may be positioned in proximity to the locking mechanism 1124 such that when the gooseneck coupler 1110 is in the locked position, the locking mechanism 1124 may engage the slot 1162 as more fully described below. The slot 1162 may be integrally formed with the base member 1116 or may be formed therein such as by machining the slot 1162 into the base member 1116 after formation of the base member 1116, by way of a non-limiting example. The base member 1116 may also include an opening 1135 that may be shaped and sized to receive a hitch ball 42.

The locking mechanism 1124 may include a body portion 1182 that may be attached to the locking member 1120 or 1120a, as shown in FIGS. 38-41a. The body portion 1182 may be welded to the locking member 1120 or 1120a or alternatively, may be integrally formed with the locking member 1120 or 1120a so that they are formed of one integral piece. The body portion 1182 may include apertures 1185 located on opposite sides of the body portion 1182.

The locking mechanism 1124 may further include a handle 1190. The handle 1190 may comprise a substantially straight tubular portion 1192 and a curved portion 1194. The straight portion 1192 and the curved portion 1194 may be integrally formed together, may be welded together, or otherwise attached using fasteners, or the like. The straight portion 1192 may extend through a body portion 1182 of the locking mechanism 1124. In particular, the straight portion 1192 may extend through apertures 1185 such that at least a portion of the straight portion 1192 is retained within the body portion 1182. At least one bushing 1196 may be retained within the apertures 1185 in the body portion 1182, which may help retain the handle 1190 within the body portion 1182.

The locking mechanism 1124 may further include a cam 1197 and a spring 1198. The spring 1198 may telescopingly engage the handle 1190 within the body portion 1182. In some embodiments, the spring 1198 may work as a dual action spring, particularly working in compression and torsion. For example, the torsion of the spring 1198 may help keep the handle 1190 and the cam 1197 in the locked position under a predetermined preload based upon the torsional compressibility of the spring 1198. The compression of the spring 1198 may also help keep the spring 1198 and bushing 1196 in place on the handle 1190. The torsion of the spring 1198 may help prevent the handle 1190 from rattling within the body portion 1182.

As shown in the exemplary embodiment of FIG. 38, the cam 1197 may be attached to the handle 1190 adjacent the spring 1198. In particular, the cam 1197 may be secured to the straight portion 1192 of the handle 1190 and may be positioned between the spring 1198 and the body portion 1182. By way of a non-limiting example, the cam 1197 may be secured to the handle 1190. The cam 1197 may include a blade 1195 that may be attached with the cam 1197. In a non-limiting example, the blade 1199 may be shaped, sized and positioned on the cam 1197 to create a substantially helix like structure. The cam 1197 may further include a lubrication fitting 1202 at an appropriate position thereon, an example of which is shown in FIGS. 38 and 40-42. The lubrication fitting 1202 may allow the lubrication of the locking mechanism 1124 and in particular certain moveable parts of the locking mechanism 1124.

In some embodiments, the locking member 1120a may include the recessed portion 1187a previously noted. The recessed portion 1187a may be of any appropriate shape, size, type or configuration, such as of a generally semi-circular shape as shown in FIGS. 40a and 41a. The recessed portion 1187a may be located at any appropriate position on the locking member 1120a, whereby the recessed portion 1187a may generally align with the opening 1135 in the base member 1116 when the base member 1116 and locking member 1120a are pivotably attached and are in the unlocked position. This alignment of the opening 1135 in the base member 1116 and the recessed portion 1187a of the locking member 1120a may provide an entrance for the hitch ball 42 to enter into a socket 1139 of the base member 1116.

In some embodiments, the locking member 1120 may include the aperture 1187 previously noted. The aperture 1187 may be of any appropriate shape, size, type or configuration, such as of a generally circular shape as shown in FIGS. 40 and 41. The aperture 1187 may be located at any appropriate position on the locking member 1120, whereby the aperture 1187 may generally align with the opening 1135 in the base member 1116 when the base member 1116 and locking member 1120 are pivotably attached and are in the unlocked position. This alignment of the opening 1135 in the base member 1116 and the aperture 1187 of the locking member 1120a may provide an entrance for the hitch ball 42 to enter into a socket 1139 of the base member 1116.

In operation, the gooseneck coupler 1110 may be positioned over the hitch ball 42 on the towing vehicle. The hitch ball 42 may be positioned through the opening 1135 in the base member 1116 and may pass through the recessed portion 1187a of the locking member 1120a or the aperture 1187 of the locking member 1120, as applicable, until the hitch ball 42 rests within the socket 1139. The locking member 1120 or 1120a may be pivoted against the hitch ball 42 to wedgingly engage the locking member 1120 or 1120a with the hitch ball 42. The handle 1190 may be used to help pivot the locking member 1120 or 1120a.

The locking mechanism 1124 may then be engaged to the locking position to lock the gooseneck coupler 1110 to the hitch ball 42. The locking mechanism 1124 may be rotated from the unlocked position to the locked position. By way of a non-limiting example, to lock the locking mechanism 1124 the handle 1190 may be rotated counter-clockwise by a user. As the handle 1190 is rotated counter-clockwise the blade 1195 may rotate in a substantially helical path and begin to engage the slot 1162 of the base member 1116, which may wedgingly engage the locking member 1120 or 1120a to the hitch ball 42. The more the handle 1190 is rotated counter-clockwise the more the blade 1195 engages the slot 1162 of the base member 1116. More specifically, the blade 1195 may move helically toward the slot 1162 of the base member 1116. As the blade 1195 engages the slot 1162 of the base member 1116, the locking member 1120 or 1120a may be pivoted relative to the base member 1116 at the pivot 1167. The more the locking member 1120 or 1120a pivots relative to the base member 1116 the more the locking member 1120 or 1120a engages the hitch ball 42 further securing the gooseneck 1110 to the hitch ball 42. The relative rotation between base member 1116 and locking member 1120 or 1120a may cause opening and recessed portion 1135, 1187 to become misaligned and secures the hitch ball 42 within socket 1139, an example of which is shown in FIG. 41.

The base member 1116 may be of a shape and size to include a symmetric entry distended surface 1180. In particular, the distended surface 1180 may be shaped so that it extends as a funnel out from the opening 1135 of the base member 1116 to create a larger surface, which may make it easier to install the hitch ball 42 through the opening 1135, and into the socket 1139. For example, when the gooseneck coupler 1110 is lowered onto the hitch ball 42 the distended surface 1180 may create a big target such that any minor misalignment between the gooseneck coupler 1110 and the hitch ball 42 may be substantially corrected. As the gooseneck coupler 1110 is lowered onto the hitch ball 42, gravity helps to move the gooseneck coupler 1110 into substantial alignment with the hitch ball 42 by riding along the distended surface 1180 until the hitch ball 42 enters the opening 1135 in the base member 1116 and through the recessed portion 1187 of the locking member 1120 or 1120a.

Figure 42:
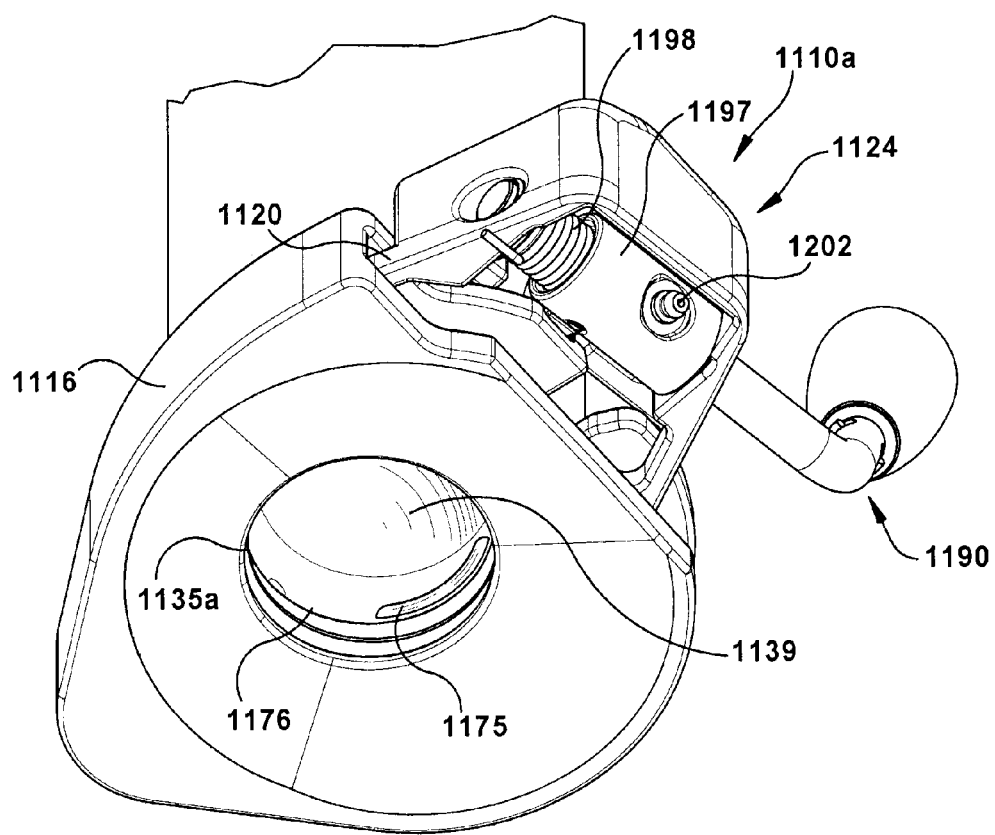
FIG. 42 is a perspective view of a portion of other embodiments of a gooseneck coupler.

In some embodiments, such as that shown in FIG. 42, the base member 1116 may further include a clinch 1175 positioned on a circumference 1176 at or adjacent to the opening 1135a to the socket 1139. Clinch 1175 may extend radially inwardly. In these embodiments, when the gooseneck coupler 1110a is in the locked position, the hitch ball 42 may be wedgingly engaged between the clinch 1175 and the locking member 1120 (or locking member 1120a). In these embodiments, the clinch 1175 may help balance the forces with the portion of the locking member 1120 (or locking member 1120a) that engages the hitch ball 42. Specifically when the clinch 1175 and the locking member 1120 (or locking member 1120a) engage the hitch ball 42 the load applied to the gooseneck coupler 1110a by the towed vehicle and the towing vehicle 11 may be transferred between both the locking member 1120 (or locking member 1120a) and through the clinch 1175 and up into the inner tube 1114. It is, therefore, possible that less load may be applied to the locking member 1120 (or locking member 1120a) during operation.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A gooseneck coupler comprising:
   a first member;
   a second member pivotally attached to the first member, wherein the second member is capable of pivoting relative to the first member from a first position to a second position;
   an opening in the first member, the opening sized to receive a hitch ball; and
   a clinch mechanism located within the opening wherein the hitch ball is wedged between the clinch mechanism and the second member when the second member is in the second position relative to the first member.

2. The gooseneck coupler of claim 1, wherein the first member comprises a first plate with a generally hollow portion and the second member comprises a blade or plate positioned within the hollow portion of the first plate.

3. The gooseneck coupler of claim 1, wherein the first member comprises a first plate and the second member comprises a second plate.

4. The gooseneck coupler of claim 3, further comprising a locking mechanism attached to the second plate, wherein the locking mechanism is capable of securing the second plate and clinch mechanism in engagement with the hitch ball.

5. The gooseneck coupler of claim 3, wherein the clinch mechanism comprises a nub positioned in the opening of the first plate.

6. The gooseneck coupler of claim 3, wherein the clinch mechanism comprises a weld bead positioned in the opening of the first plate.

7. The gooseneck coupler of claim 3, wherein the hitch ball includes a hemispherical centerline and wherein the clinch mechanism and the second plate engage the hitch ball at the hemispherical centerline when the second plate is in the second position relative to the first plate.

8. The gooseneck coupler of claim 3, wherein the hitch ball includes a hemispherical centerline and wherein the clinch mechanism and the second plate engage the hitch ball below the hemispherical centerline when the second plate is in the second position relative to the first plate.

9. The gooseneck coupler of claim 3, wherein the clinch mechanism engages the hitch ball at a first location on the hitch ball and the second plate engages the hitch ball at a second location on the hitch ball when the second plate is in the second position relative to the first plate.

10. The gooseneck coupler of claim 9, wherein the second location is lower on the hitch ball than the first location.

11. The gooseneck coupler of claim 1, wherein the clinch mechanism comprises a continuous raised surface extending radially from the opening and extending at least a portion of a circumference of the opening.

12. The gooseneck coupler of claim 1, wherein the clinch mechanism comprises a plurality of discontinuous raised surfaces extending radially from the opening and positioned on at least a portion of a circumference of the opening.

13. The gooseneck coupler of claim 1, wherein the clinch mechanism is a raised member removably attachable along a predetermined position along a circumference of the opening.

14. The gooseneck coupler of claim 13, wherein the raised member extends continuously along a portion of the circumference of the opening.

15. The gooseneck coupler of claim 13, wherein the raised member comprises a plurality of raised members discontinuously and removably attached to the circumference of the opening.

16. The gooseneck coupler of claim 1, wherein the clinch mechanism is cast into the opening.

17. The gooseneck coupler of claim 1, wherein the clinch mechanism is forged into the opening.

18. The gooseneck coupler of claim 1, wherein the clinch mechanism is integrally formed with the opening.

19. The gooseneck coupler of claim 1, wherein the clinch mechanism is removably attached to the opening.

20. The gooseneck coupler of claim 1, wherein the first member includes a recess of substantially equal size to the clinch mechanism, the recess positioned laterally opposite the clinch mechanism.

21. The gooseneck coupler of claim 1, wherein the clinch mechanism extends one-half of a circumference of the opening.

22. The gooseneck coupler of claim 1, wherein the clinch mechanism extends between one-half and one-third of a circumference of the opening.

23. The gooseneck coupler of claim 1, wherein the clinch mechanism extends less than one-third of a circumference of the opening.

24. A gooseneck coupler comprising:
   a base plate;
   a locking plate pivotally attached to the base plate;
   an opening in the base plate, the opening sized to receive a hitch ball;
   a clinch mechanism extending radially from the opening and extending a portion of a circumference of the opening; and
   a locking mechanism rotatable from a locked position pivotally locking the locking plate relative to the base plate to secure engagement of the hitch ball between the locking plate and the clinch mechanism to an unlocked position allowing pivotal movement of the locking plate relative to the base plate to thereby release the locking plate and the clinch mechanism from engagement with the hitch ball.

25. The gooseneck coupler of claim 24, wherein the clinch mechanism comprises a raised surface extending a portion of a circumference of the opening.

26. The gooseneck coupler of claim 25, further comprising a recess positioned on the base plate laterally opposed to the raised surface.

27. The gooseneck coupler of claim 26, wherein the recess is of substantially corresponding size to the raised surface.

28. A gooseneck coupler comprising:
   a base plate;
   a locking plate pivotally attached to the base plate;
   an opening in the base plate, the opening sized to receive a hitch ball having a spherical portion;
   a raised surface extending radially from the opening; and
   a locking mechanism attached to the locking plate, wherein the locking mechanism is capable of securing the locking plate and raised surface in engagement with the spherical portion of the hitch ball.

29. The gooseneck coupler of claim 28, further comprising a socket adjacent the base plate and positioned over the opening, wherein the socket is capable of engaging a portion of the hitch ball.

30. The gooseneck coupler of claim 29, wherein the hitch ball has an articulation angle of approximately between 1 and 18 degrees relative to the socket when the locking plate and raised surface are in engagement with the spherical portion of the hitch ball.

31. The gooseneck coupler of claim 28, further comprising a recess positioned in the opening laterally opposed the raised surface, wherein the recess is sized to allow the hitch ball to pass through the opening.

* * * * *